United States Patent
Tajima et al.

(10) Patent No.: US 8,773,746 B2
(45) Date of Patent: Jul. 8, 2014

(54) ALL-SOLID-STATE REFLECTIVE DIMMING ELECTROCHROMIC ELEMENT SEALED WITH PROTECTIVE LAYER, AND DIMMING MEMBER COMPRISING THE SAME

(75) Inventors: Kazuki Tajima, Nagoya (JP); Yasusei Yamada, Nagoya (JP); Kazuki Yoshimura, Nagoya (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 15 days.

(21) Appl. No.: 13/520,910

(22) PCT Filed: Dec. 28, 2010

(86) PCT No.: PCT/JP2010/073777
§ 371 (c)(1),
(2), (4) Date: Sep. 20, 2012

(87) PCT Pub. No.: WO2011/083734
PCT Pub. Date: Jul. 14, 2011

(65) Prior Publication Data
US 2013/0010347 A1    Jan. 10, 2013

(30) Foreign Application Priority Data

Jan. 8, 2010    (JP) ................. 2010-003254
Dec. 21, 2010   (JP) ................. 2010-285168

(51) Int. Cl.
*G02F 1/153*    (2006.01)
(52) U.S. Cl.
USPC ........... 359/267; 359/270; 359/273; 359/274

(58) Field of Classification Search
USPC ........... 359/265, 270, 273, 274, 267; 345/697
See application file for complete search history.

(56) References Cited

U.S. PATENT DOCUMENTS

| | | | |
|---|---|---|---|
| 7,545,551 B2 * | 6/2009 | Yoshimura et al. | 359/273 |
| 8,189,255 B2 * | 5/2012 | Yoshimura et al. | 359/273 |
| 8,284,472 B2 * | 10/2012 | Yoshimura et al. | 359/270 |
| 2010/0188726 A1 | 7/2010 | Yoshimura et al. | |

FOREIGN PATENT DOCUMENTS

| | | |
|---|---|---|
| GB | 2194704 | 3/1988 |
| JP | 61-160783 | 7/1986 |
| JP | 2001-33830 | 2/2001 |
| JP | 2009-25785 | 2/2009 |

OTHER PUBLICATIONS

International Search Report issued Mar. 15, 2011 in International (PCT) Application No. PCT/JP2010/073777.

* cited by examiner

*Primary Examiner* — Loha Ben
(74) *Attorney, Agent, or Firm* — Wenderoth, Lind & Ponack, L.L.P.

(57) ABSTRACT

An all-solid-state reflective dimming electrochromic element having a multilayer film formed on a transparent substrate, which is characterized in that the multilayer film has a multilayer structure comprising at least a transparent conductive film layer, an ion storage layer, a solid electrolyte layer, a buffer layer, a catalyst layer, a reflective dimming layer, and a protective layer formed on the transparent substrate, and which is sealed with the protective layer, and a dimming member comprising the same are provided.

17 Claims, 17 Drawing Sheets

FIG. 1
(a)
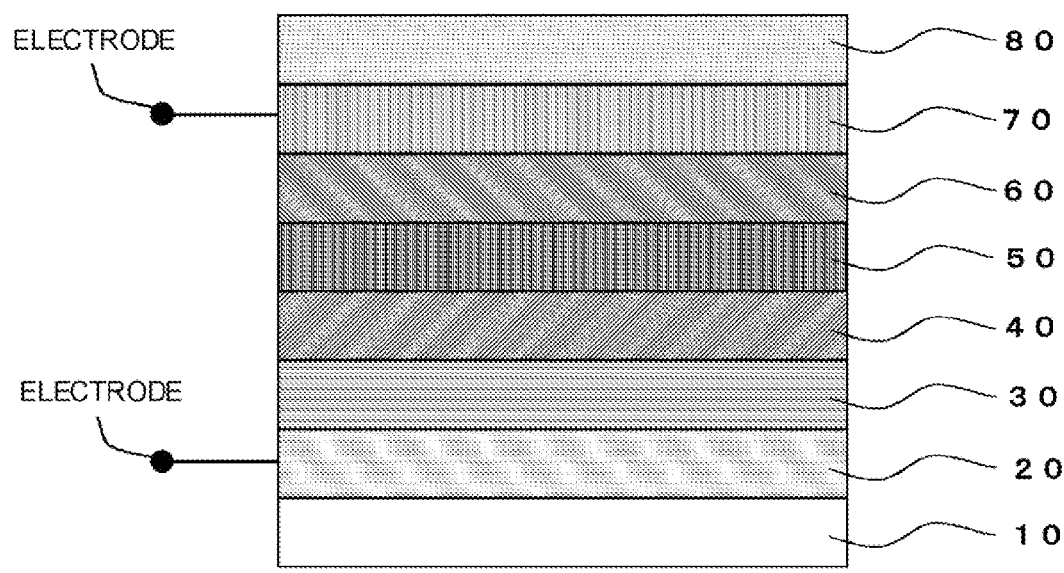
(b)
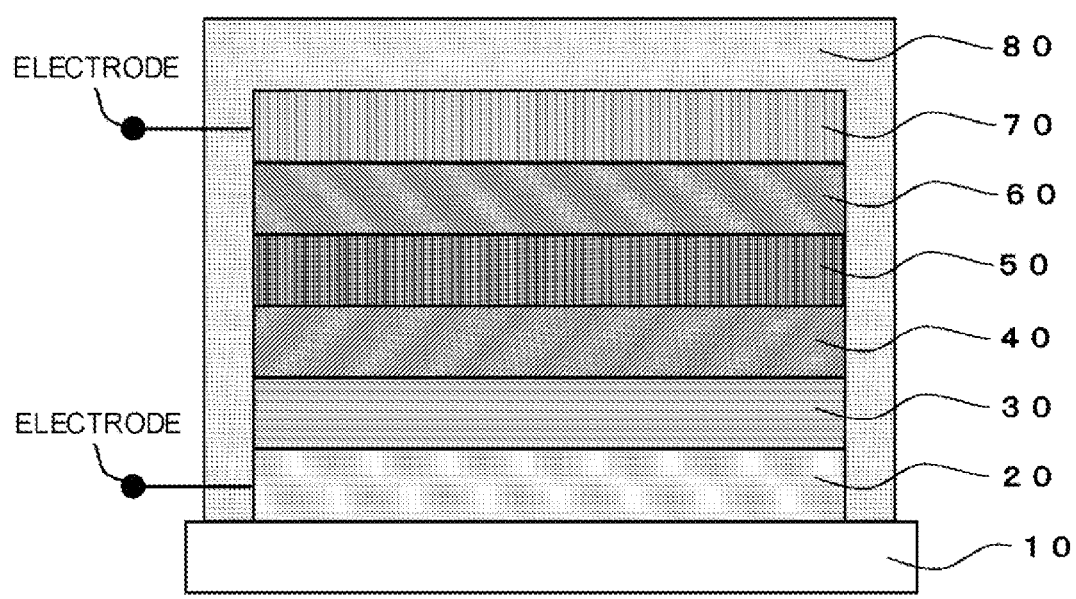

F I G. 2
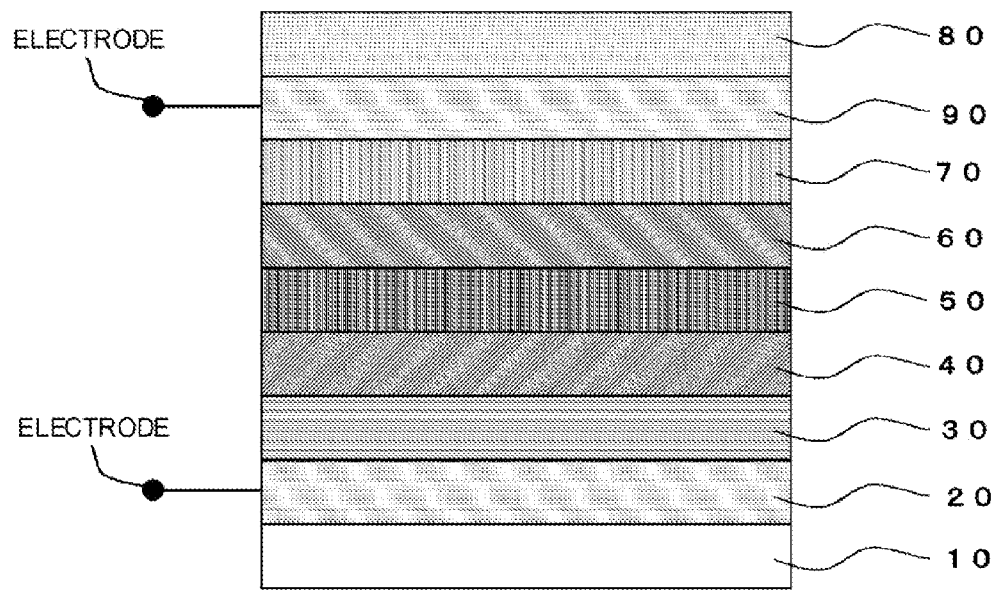
F I G. 3
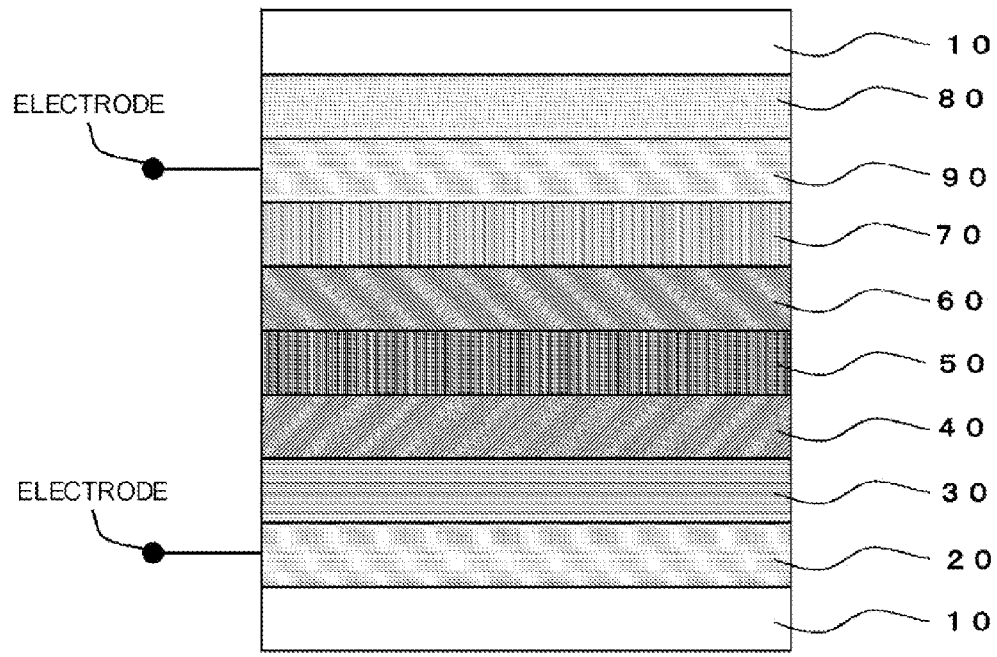

F I G. 4
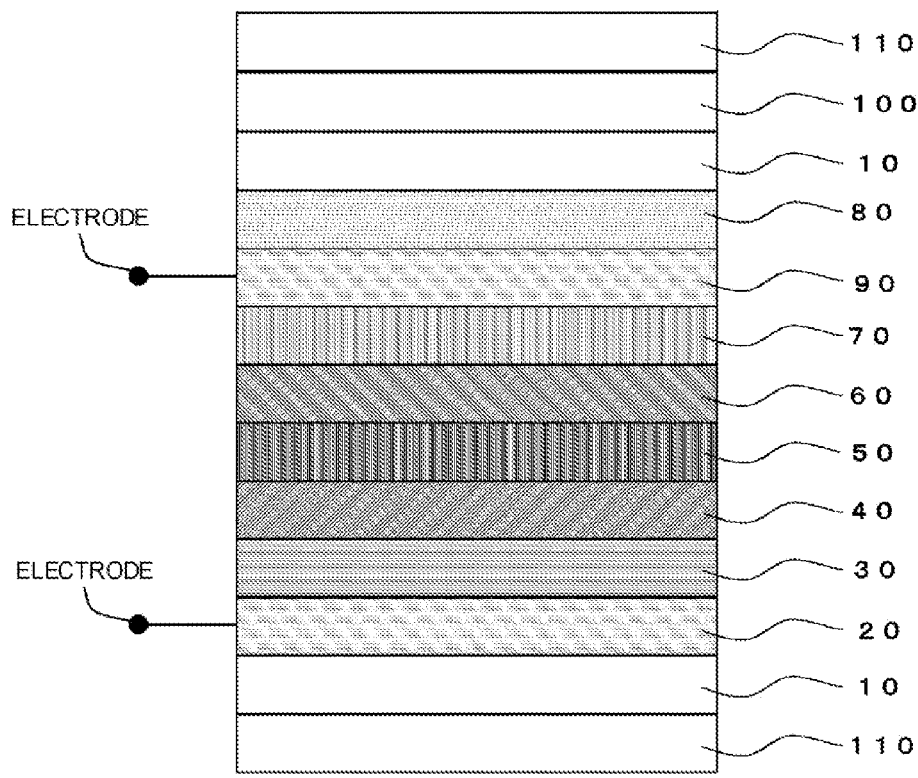
F I G. 5
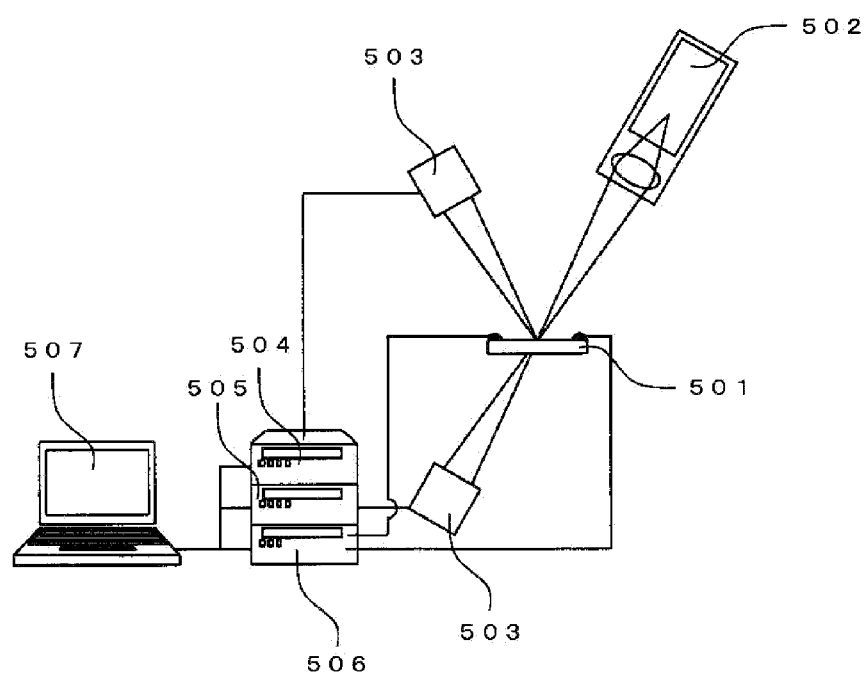

F I G. 6
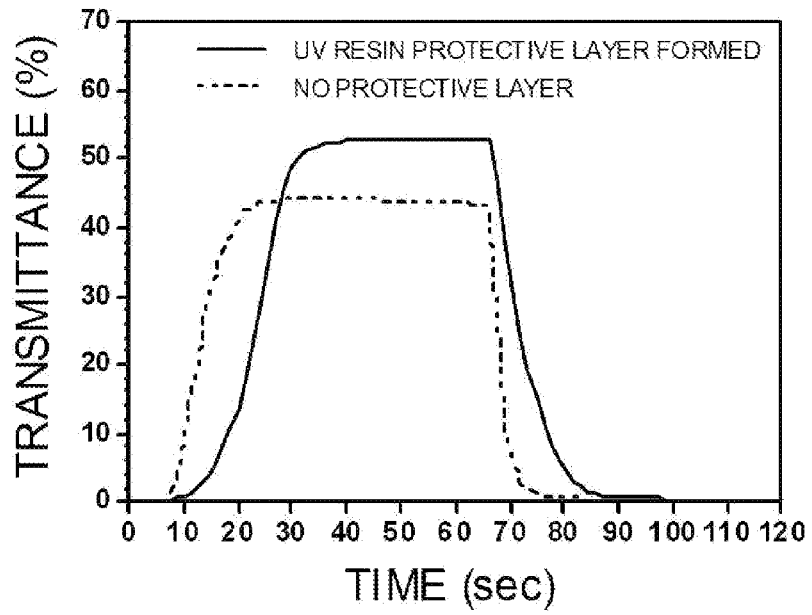
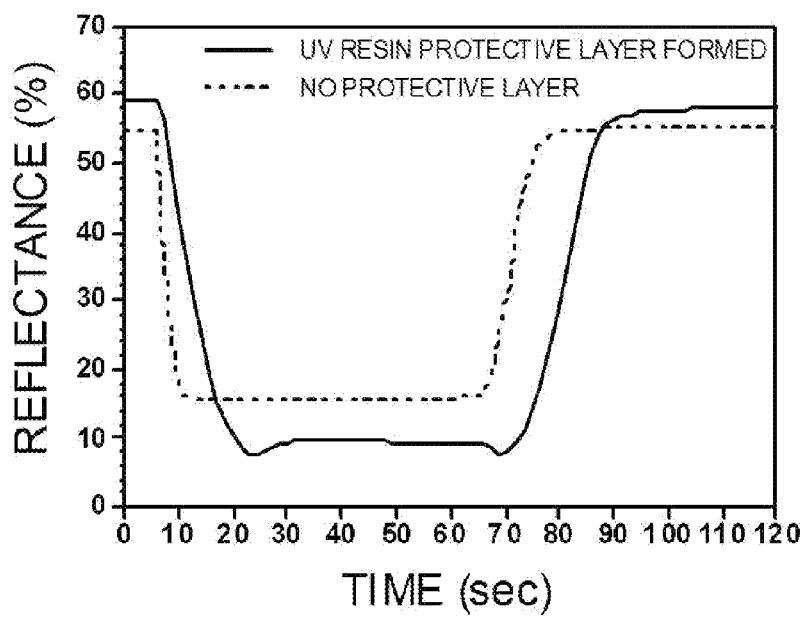

F I G. 7
(a) TRANSMISSION SPECTRUM
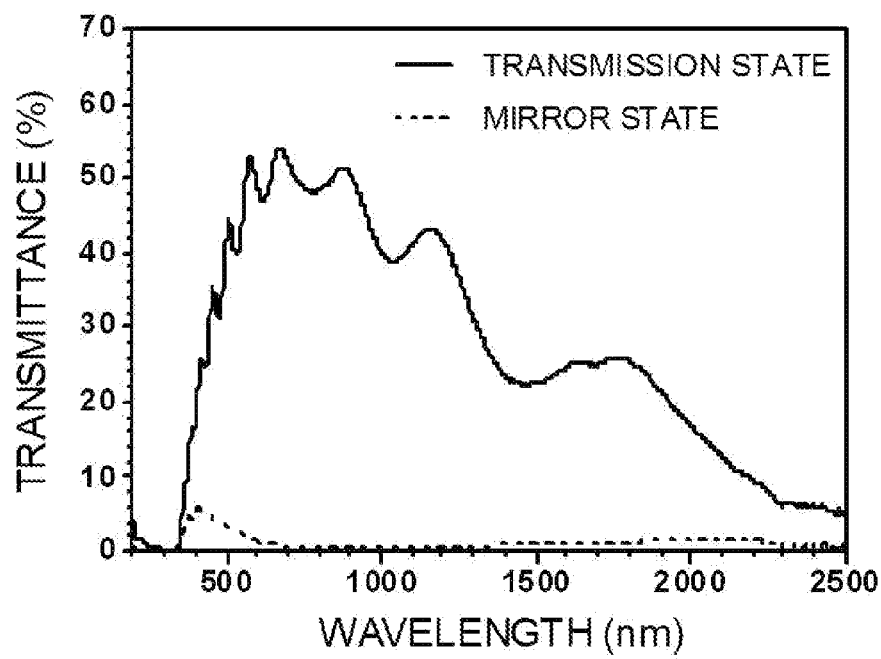
(b) REFLECTION SPECTRUM
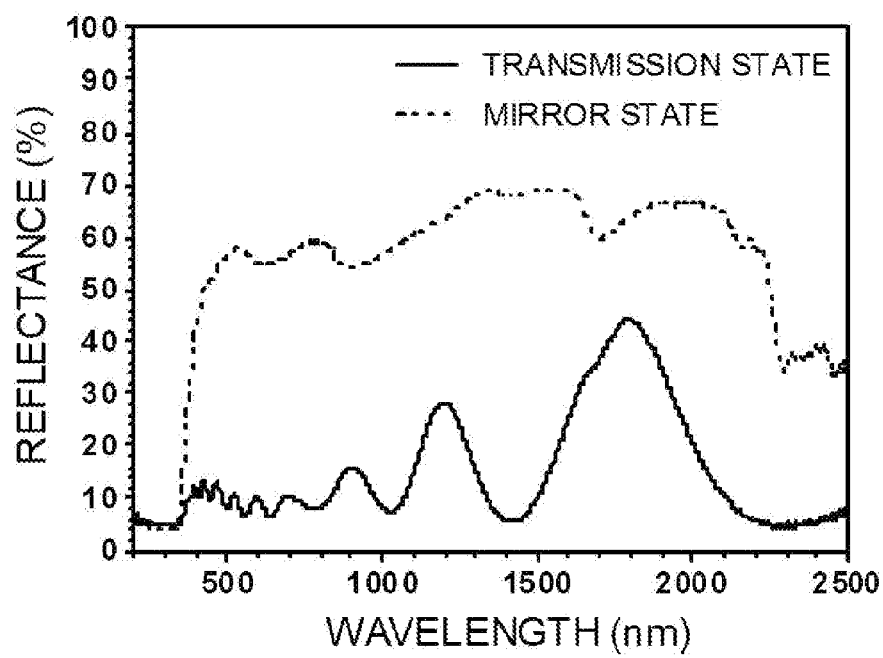

FIG. 9
PROTECTIVE LAYER FORMED
(a) IMMEDIATELY AFTER PREPARED
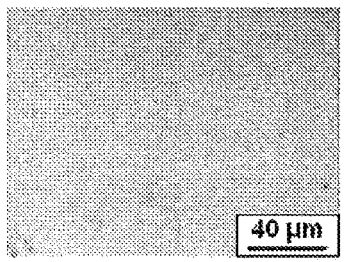
(b) AFTER 7 DAYS
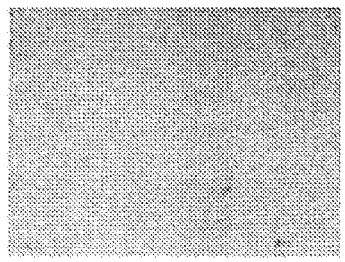
(c) AFTER 12 DAYS
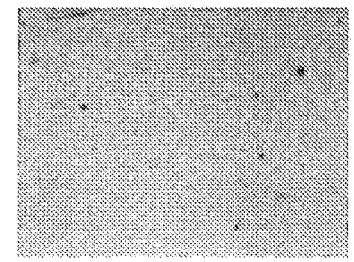
NO PROTECTIVE LAYER
(d) IMMEDIATELY AFTER PREPARED
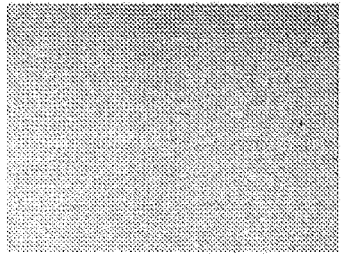
(e) AFTER 7 DAYS
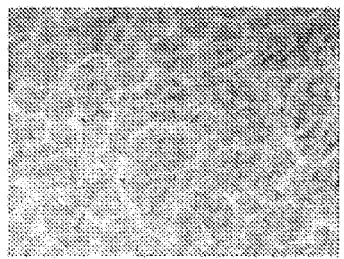
(f) AFTER 12 DAYS
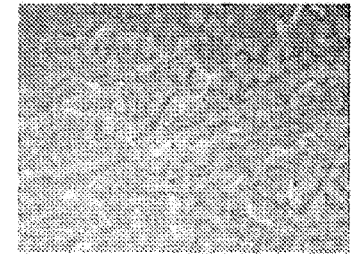

FIG. 10
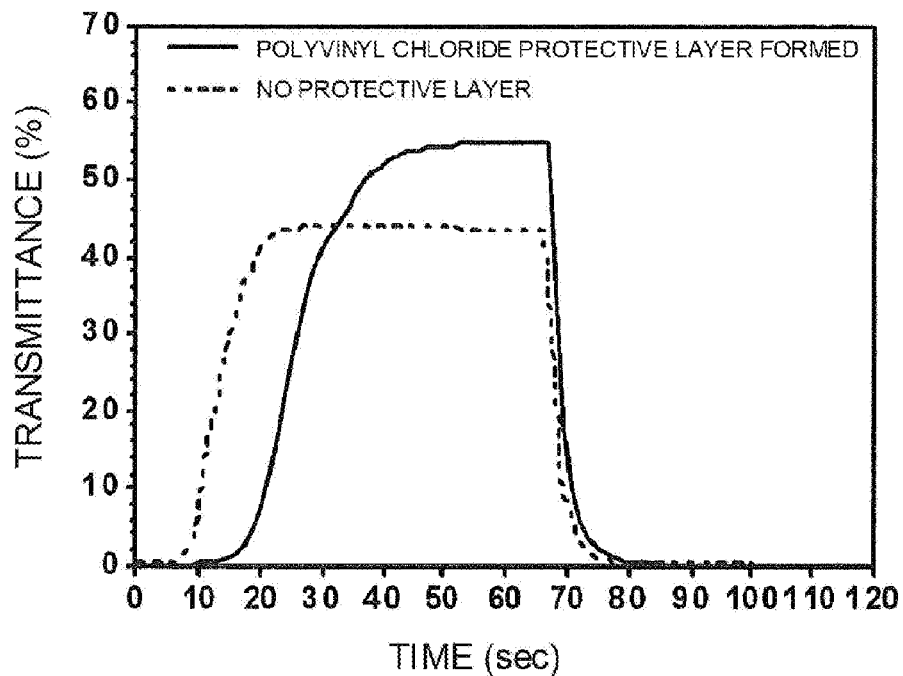
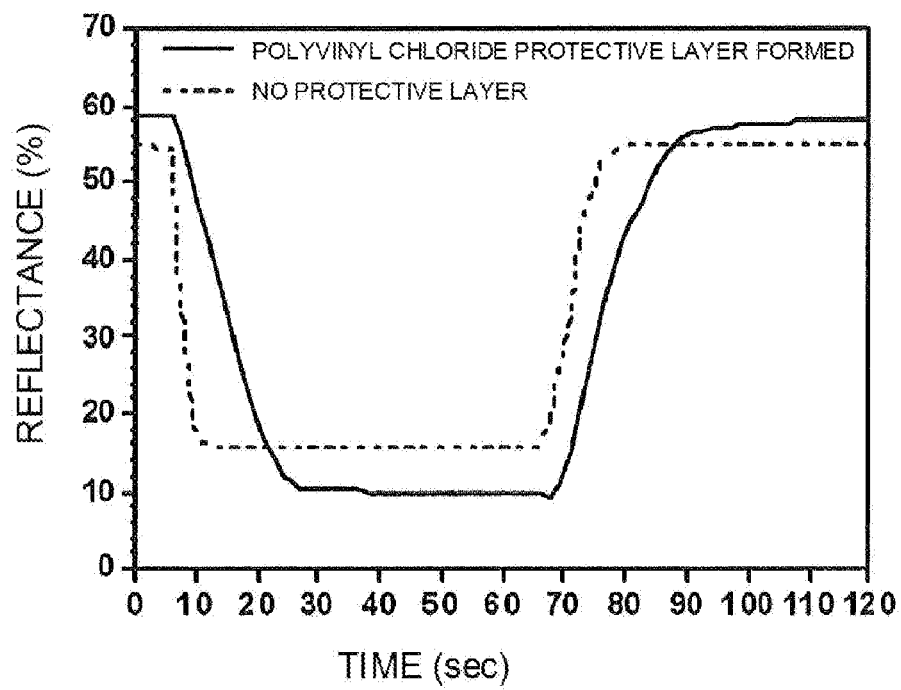

FIG. 11
(a) TRANSMISSION SPECTRUM
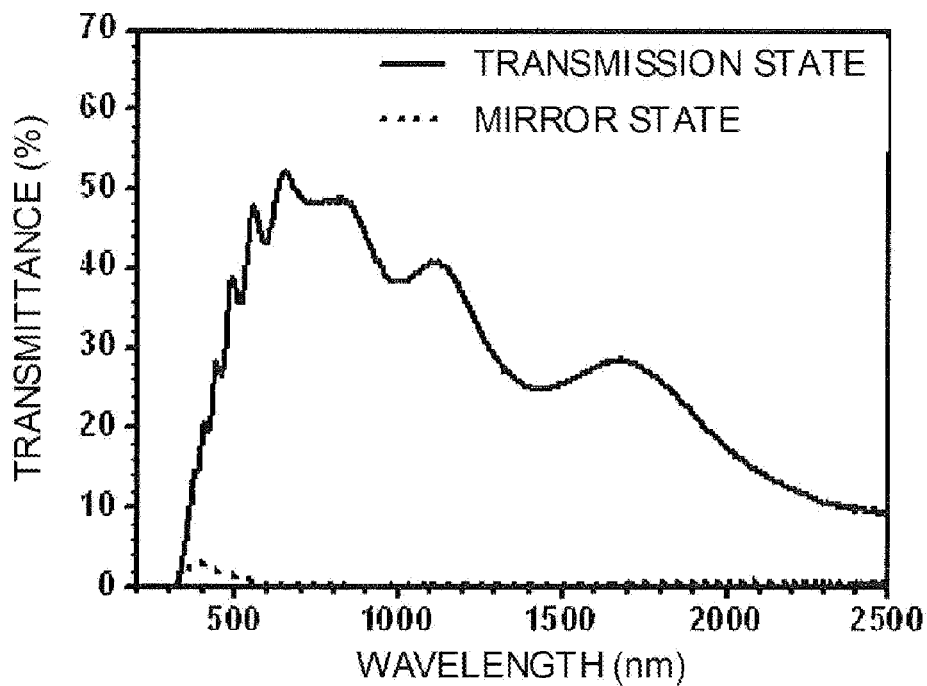
(b) REFLECTION SPECTRUM
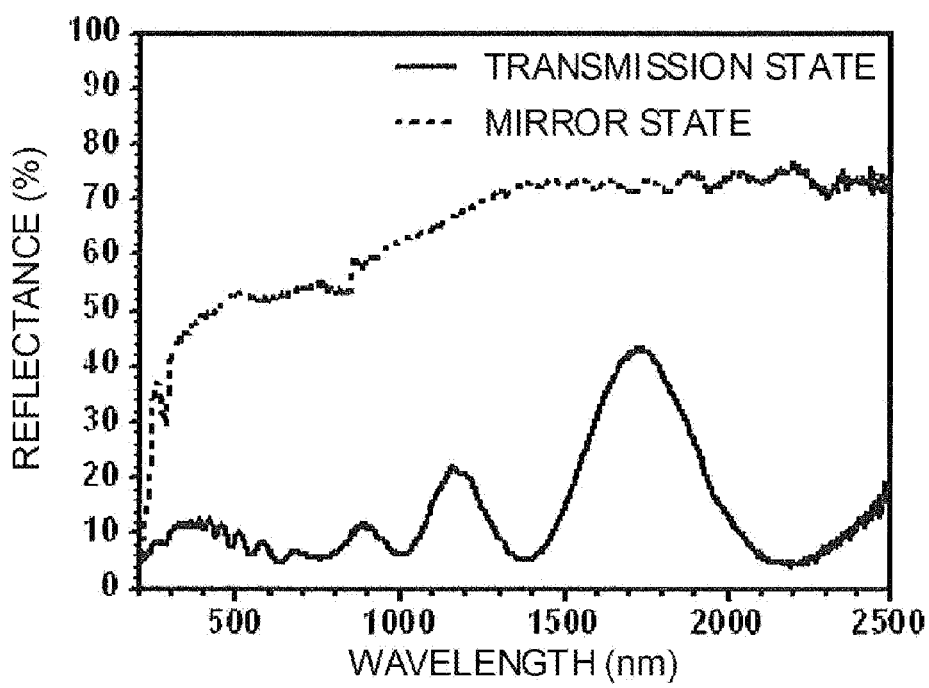

FIG. 12
(a) OPTICAL TRANSMITTANCE
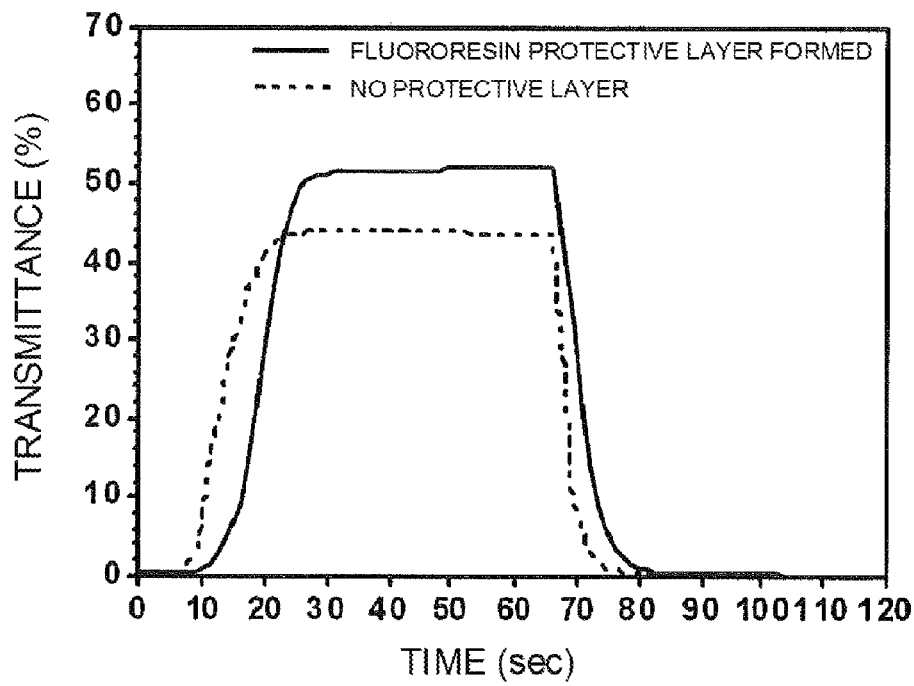
(b) OPTICAL REFLECTANCE
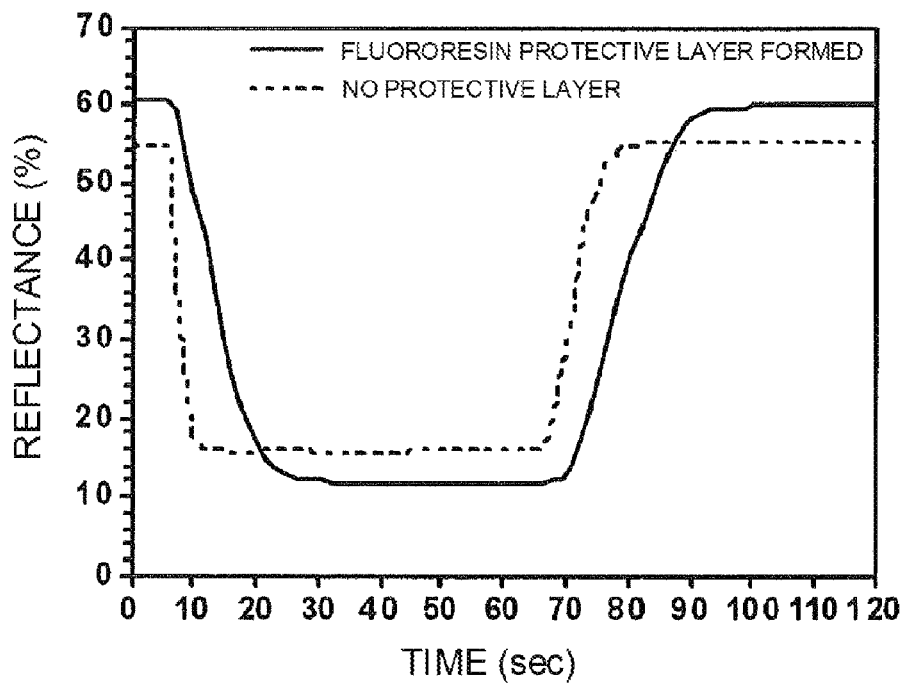

F I G. 1 3
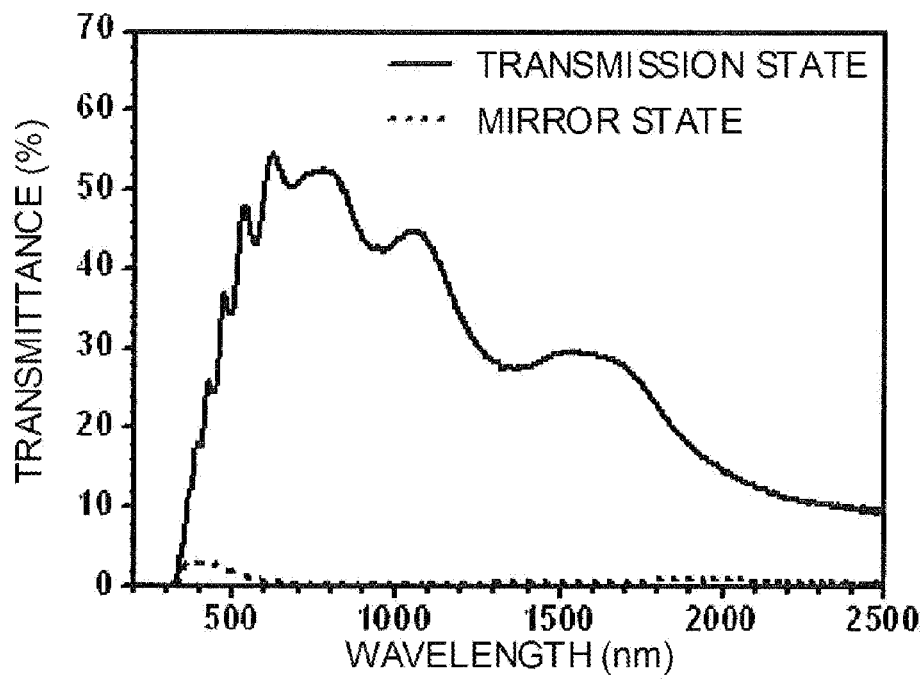
(a) TRANSMISSION SPECTRUM
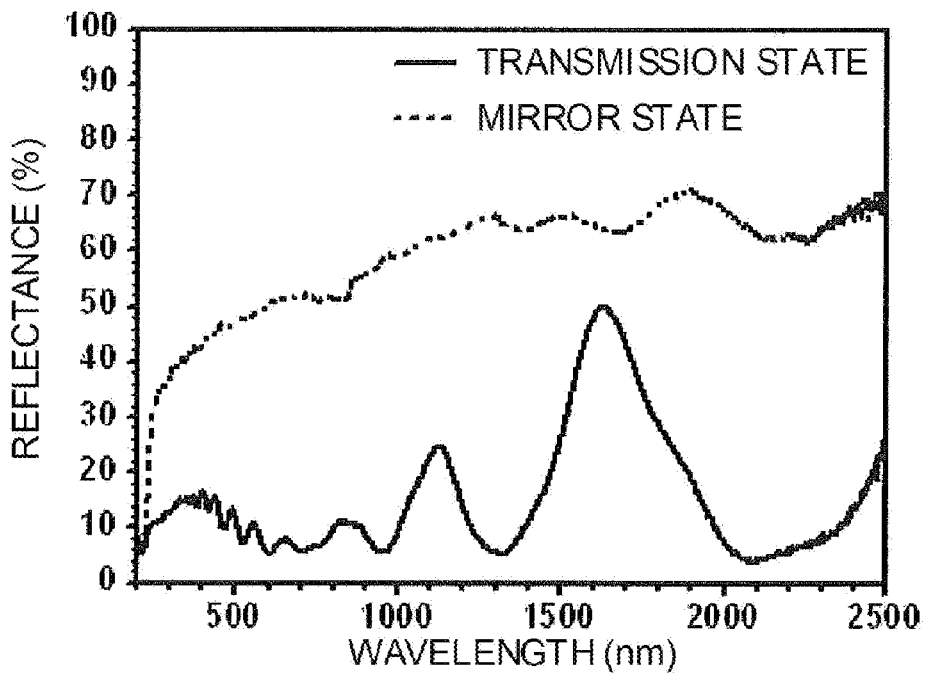
(b) REFLECTION SPECTRUM FIG. 14
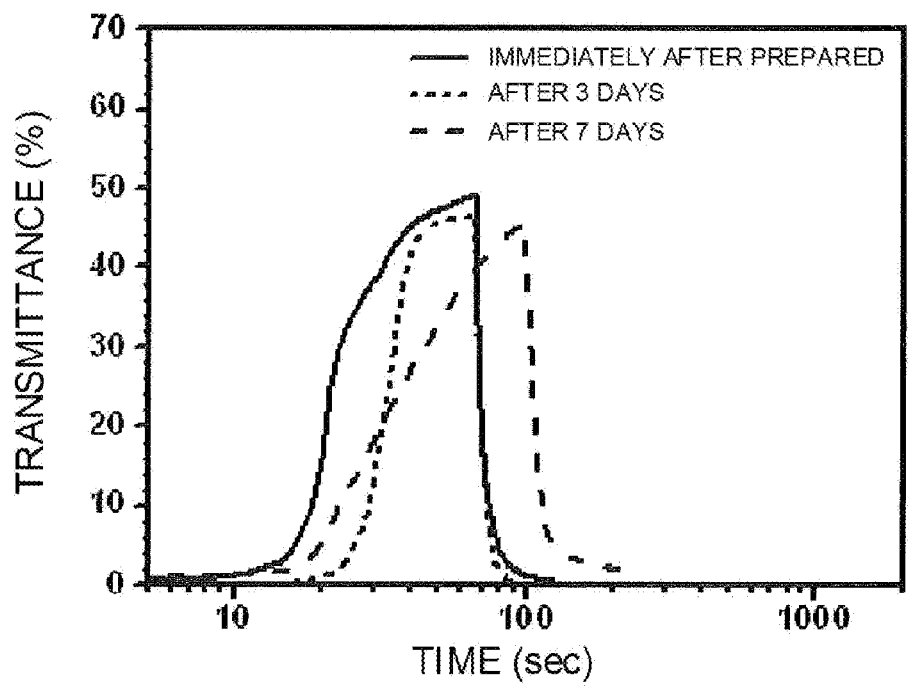
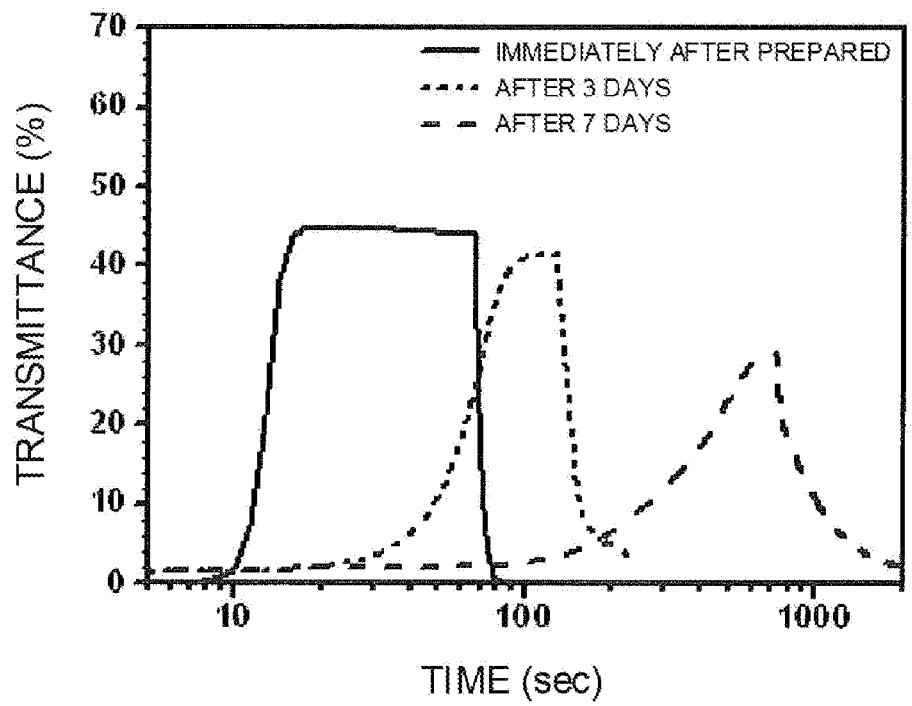

FIG. 15
PROTECTIVE LAYER FORMED
(a) IMMEDIATELY AFTER PREPARED
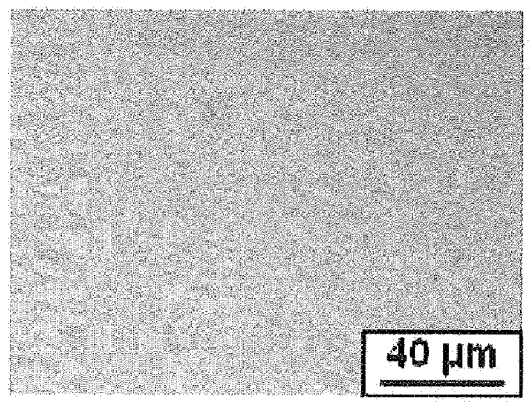
(b) AFTER 11 DAYS
(c) AFTER 23 DAYS
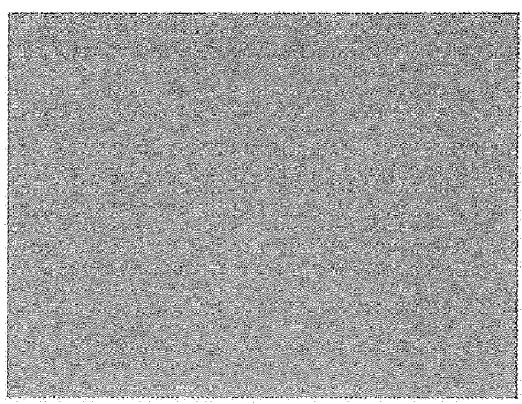

FIG. 16
(a) OPTICAL TRANSMITTANCE
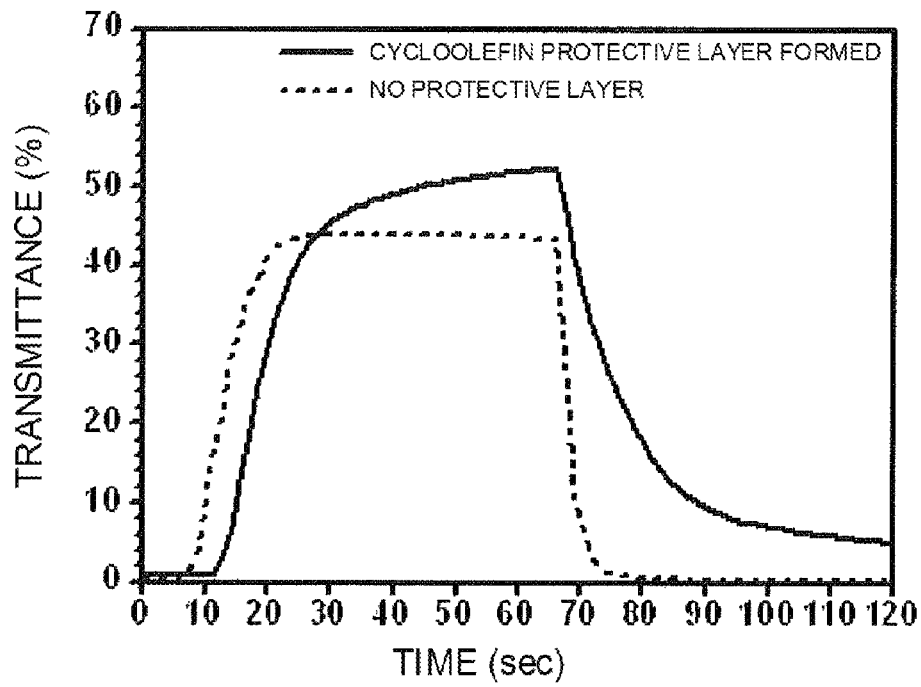
(b) OPTICAL REFLECTANCE
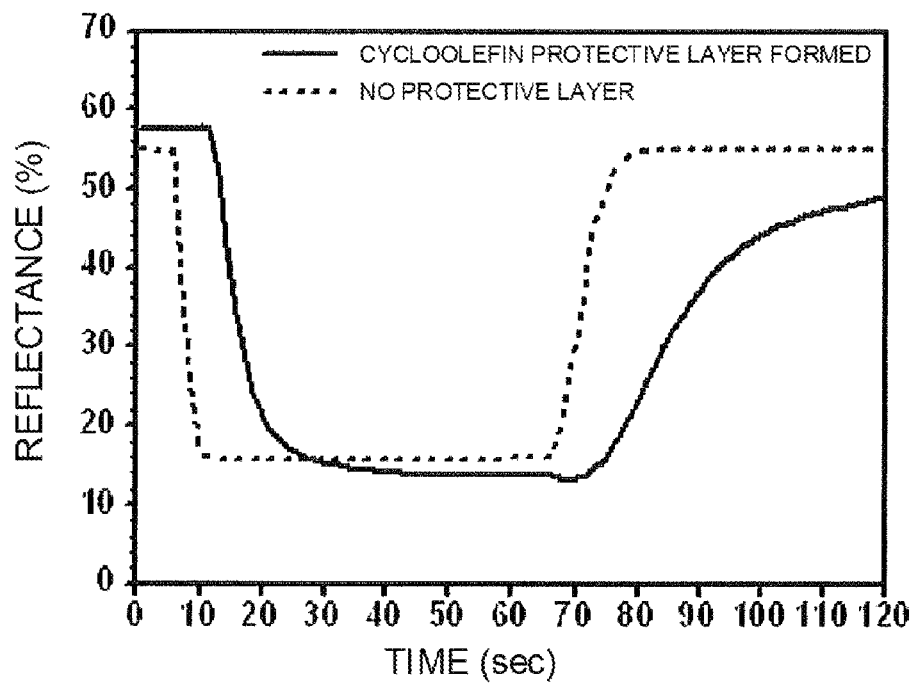

F I G. 1 7
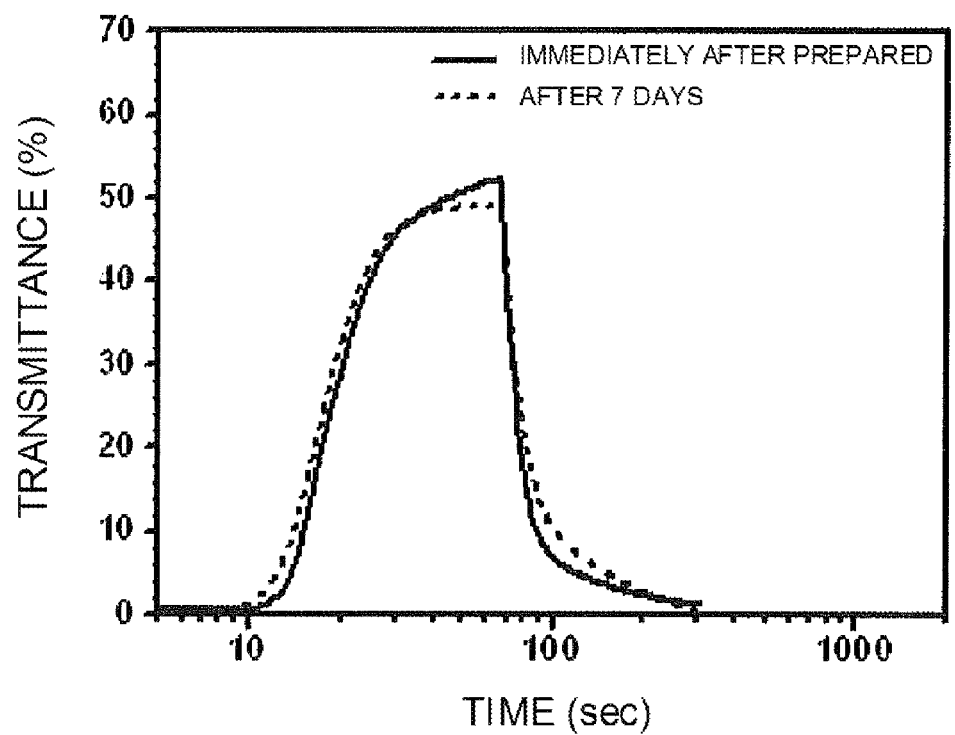

FIG. 18
PROTECTIVE LAYER FORMED
(a) IMMEDIATELY AFTER PREPARED
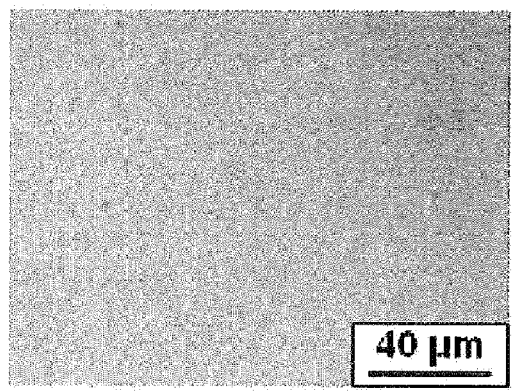
(b) AFTER 3 DAYS
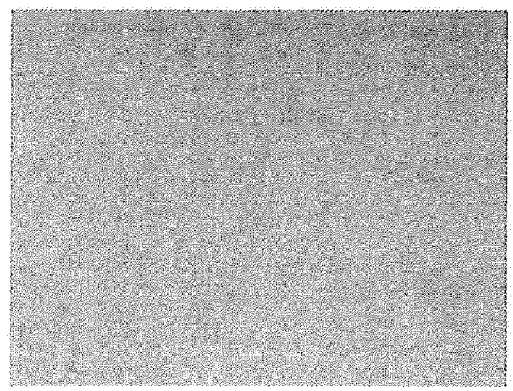
(c) AFTER 14 DAYS
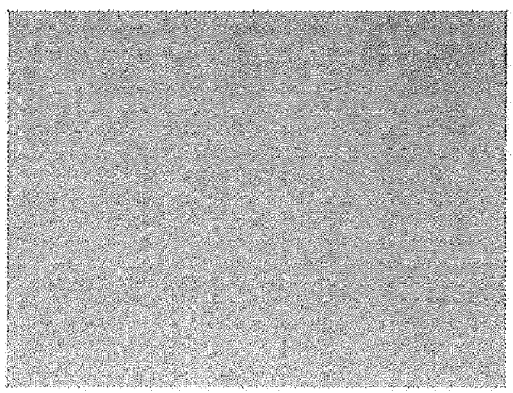

ALL-SOLID-STATE REFLECTIVE DIMMING ELECTROCHROMIC ELEMENT SEALED WITH PROTECTIVE LAYER, AND DIMMING MEMBER COMPRISING THE SAME

TECHNICAL FIELD

The present invention relates to an all-solid-state reflective dimming electrochromic element sealed with a protective layer and a dimming member comprising the same, and more particularly to an all-solid-state reflective dimming electrochromic element which can be electrically controlled in the transmission of light or heat by electrically and reversibly switching the surface of glass from the mirror state to the transmission state, and a dimming member comprising the same.

BACKGROUND ART

Generally, the window glass for a building serves as a large outlet or inlet of heat, and, for example, when the inside of a building is heated in winter, about 48% of the heat of the inside is taken away from the window, and, when the inside of a building is cooled in summer, about 71% of the heat of the inside comes from the outside through the window. A similar phenomenon occurs in vehicles for movement and the like. Particularly, in an automobile, the ratio of the window glass to the space is larger than that in a building structure, and further an automobile hardly avoids exposure to sunlight, and hence the temperature of the interior of the automobile in a certain environment, e.g., under the blazing sun is likely to become extremely high.

An example of measurement made in an environment of summer in Japan shows that the temperature in a parked automobile is close to 70° C. With respect to the temperature of the trim of the interior of the automobile, the temperature of the upper surface of an instrument panel is increased to about 100° C., and the temperature of a ceiling is increased to about 70° C. Further, even when using a ventilating or cooling apparatus, the trim is not easily lowered in temperature and continues radiating heat toward a driver and a passenger(s) for a long time to make them feel uncomfortable.

As a technique for solving the above problems, there has been developed a dimming glass capable of controlling the transmission of light and heat through it. There is a dimming glass using a dimming element, and examples of such dimming elements include: 1) an electrochromic element using a material which is reversibly changed in transmittance by applying a current or a voltage; 2) a thermochromic element using a material which is changed in transmittance due to the temperature; and 3) a gaschromic element using a material which is changed in transmittance by controlling the atmosphere gas.

Among these elements, the electrochromic element can be electrically controlled with respect to the transmission state of light and heat, and can be adjusted to a transmission state of light and heat according to the intention of a user, and therefore the electrochromic element is very suitable for a dimming material applied to glass for buildings and vehicles. Further, the electrochromic element can maintain its optical properties in a certain state even when no current or voltage is applied to the element, making it possible to reduce the energy used.

There is an electrochromic element of a type such that a part of the materials constituting the element is in a liquid state, and the electrochromic element of this type is required to have a structure which prevents the liquid material from leaking from the element. Buildings and vehicles are assumed to be used for a long term, and the leakage of the liquid material can be prevented over a long term, but this causes the cost to be increased, and therefore it is desired that all the materials constituting the electrochromic element are solid materials.

The conventionally known electrochromic elements using a solid material, such as tungsten oxide, have a principle that the dimming material absorbs a light to achieve dimming. Specifically, the penetration of heat in the form of a light to the interior is suppressed by the absorption of the light. For this reason, when the dimming material having such a dimming principle is employed, there is a problem in that the dimming material has heat due to the absorption of the light, so that the heat of the dimming material is re-radiated to the interior as radiation heat.

As a method for solving this problem, a method in which dimming is performed not by absorbing a light but by reflecting a light is considered. In other words, by using a reflective dimming material which reversibly switches from the mirror state to the transparent state, the penetration of heat to the interior due to the absorption of heat by the dimming material can be prevented.

With respect to the reflective dimming type electrochromic element having such properties, there has been disclosed, for example, an electrochromic element having a reflective dimming layer comprising an alloy of a rare earth metal and magnesium and a hydride thereof, a hydrogen ion conducting, transparent oxide protective layer, an anhydrous solid electrolyte layer, and an ion storage layer, which layers are stacked on one another (see, for example, patent document 1).

The reflective dimming layer has a function to control the reflectance of the electrochromic element, and changes the reflectance by giving or receiving hydrogen ions. The oxide protective layer comprises a compound having hydrogen ion conducting properties, e.g., an oxide, such as niobium oxide, vanadium oxide, or tantalum oxide, or a fluoride, such as magnesium fluoride or lead fluoride, and prevents the reflective dimming layer from suffering oxidation.

The ion storage layer stores hydrogen ions used for controlling the reflectance. When a voltage is applied to the dimming glass, hydrogen ions move from the ion storage layer to the reflective dimming layer through the solid electrolyte layer and oxide protective layer, changing the reflectance of the reflective dimming layer. When a voltage is applied in the opposite direction, hydrogen ions are discharged from the reflective dimming layer, bringing the reflectance of the reflective dimming layer back into the original state. This element, however, uses an expensive rare earth metal in the reflective dimming layer, and therefore, from the viewpoint of the cost, the application of this element to an increased area is difficult.

As a reflective dimming element using an inexpensive and more practical material in the reflective dimming layer, for example, there has been proposed an element having $Mg_2Ni$ as a reflective dimming layer and palladium or platinum as a catalyst layer which are stacked on one another (see, for example, patent document 2). However, the material of this type in the transparent state has such a low transmittance that the material cannot be practically used.

The dimming mirror glass using a magnesium-nickel alloy thin film, which is developed by a part of the present inventors, is of a gaschromic system using hydrogen gas, and has a visible light transmittance of about 50%, which has remarkably improved, as compared to 20% of the conventionally reported element using $Mg_2Ni$, and can be possibly put into a practical use soon (see, for example, patent document 3).

Further, with respect to the all-solid-state dimming mirror element using a magnesium-nickel alloy thin film, there has been proposed an all-solid-state dimming mirror light switch having an ion storage layer, a solid electrolyte layer, and a magnesium-nickel alloy as a reflective dimming element stacked on a transparent substrate (see, for example, patent document 4).

The all-solid-state dimming mirror light switch using a magnesium-nickel alloy thin film has a problem in that the switch in the transmission state is colored pale yellow and is not in a completely colorless and transparent state. In view of the transparency of this element in the transmission state, the present inventors have proposed an all-solid-state dimming mirror light switch using a magnesium-titanium alloy thin film or a magnesium-niobium alloy thin film, which exhibits an almost colorless and transparent state when it is in the transmission state (see, for example, patent documents 5 and 6).

However, with respect to the repeated use, this element has a disadvantage in that the element can achieve switching 1,000 times or more, but the resultant element suffers deterioration and thus cannot revert to the reflection state. One of the causes of this deterioration suggests that as the switching is repeated, the reflective dimming layer component and catalyst layer component are gradually diffused through the solid electrolyte layer (see, for example, non-patent document 1).

For removing the above disadvantage, there has been proposed an all-solid-state dimming mirror light switch that can achieve repeatedly switching increased times, in which an aluminum thin film is used as a buffer layer for the purpose of preventing the constituents of the layers from diffusing through the all-solid-state reflective dimming electrochromic element using a magnesium alloy thin film (see, for example, patent document 7).

It has been considered that the reflective dimming layer constituting the surface of the element is in contact with air immediately after the preparation of the element, and hence a thin layer of magnesium oxide is formed on the surface of the reflective dimming layer and this oxide layer functions as a passive layer. However, when the element was maintained in air for a long term, which was performed as an example of environmental test, a phenomenon in which the element lost the dimming properties was observed, and therefore thorough studies were made on the mechanism of deterioration of the element.

As a result, the surface magnesium oxide layer had a so poor function as a passive layer that rapid deterioration of the layer was observed in a high humidity atmosphere. One of the causes of this deterioration suggests that the oxygen and humidity in air cause the reflective dimming layer to change to an oxide or hydroxide (see, for example, non-patent document 2). Therefore, in this technical field, the development of an all-solid-state reflective dimming electrochromic element having high durability and being almost free of environmental deterioration has been strongly desired.

PRIOR ART DOCUMENTS

Patent Documents

Patent document 1: JP-A-2000-204862
Patent document 2: U.S. Pat. No. 6,647,166
Patent document 3: JP-A-2003-335553
Patent document 4: JP-A-2005-274630
Patent document 5: JP-A-2008-152070
Patent document 6: JP-A-2008-152071
Patent document 7: JP-A-2009-025785

Non-Patent Documents

Non-patent document 1: K. Tajima, Y. Yamada, S. Bao, M. Okada and K. Yoshimura, "Durability of All-Solid-State Switchable Mirror Based on Magnesium-Nickel Thin Film", Electrochemical Solid State Letters, vol. 10, no. 3, pp. J52-54, 2007

Non-patent document 2: K. Tajima, Y. Yamada, S. Bao, M. Okada and K. Yoshimura, "Analysis of Degradation of Flexible All-Solid-State Switchable Mirror Based on Mg—Ni Thin Film", Japanese Journal of Applied Physics, vol. 48, no. 10, pp. 102402-1-102402-5, 2009

SUMMARY OF THE INVENTION

Problems to be Solved by the Invention

It is an object of the present invention to provide an all-solid-state reflective dimming electrochromic element which uses a magnesium alloy thin film having a high transmittance in the transparent state or the like in a reflective dimming layer, which has a multilayer stacked structure in which an ion storage layer, a solid electrolyte layer, a buffer layer, and a catalyst layer are stacked so that the reflective dimming layer on the solid electrolyte side becomes transparent, and which has a surface sealed with a protective layer to enable switching in a short time over a wide range, and a dimming member comprising the same.

Means for Solving the Problems

The present inventors have conducted extensive and intensive studies with a view toward developing an electrochromic element which can fundamentally solve the above-mentioned problems. As a result, it has been found that by sealing the all-solid-state reflective dimming electrochromic element using a magnesium alloy thin film with an organic compound material or the like as a protective layer, the element is improved in the durability to environment and further improved in the dimming properties, and the present invention has been completed. Specifically, the invention has the following characteristic features.

The first aspect of the invention is an all-solid-state reflective dimming electrochromic element having a multilayer film formed on a transparent substrate, wherein the multilayer film has a multilayer structure comprising at least a transparent conductive film layer, an ion storage layer, a solid electrolyte layer, a buffer layer, a catalyst layer, a reflective dimming layer, and a protective layer formed on the transparent substrate.

The second aspect of the invention is the first all-solid-state reflective dimming electrochromic element, wherein the transparent substrate is glass or a resin sheet.

The third aspect of the invention is the first all-solid-state reflective dimming electrochromic element, which exhibits a reflective dimming action by applying a voltage and/or flowing a current between the transparent conductive film layer and the reflective dimming layer.

The fourth aspect of the invention is the first all-solid-state reflective dimming electrochromic element, wherein the ion storage layer formed on the transparent conductive film layer is a transition metal oxide thin film.

The fifth aspect of the invention is the first all-solid-state reflective dimming electrochromic element, wherein the solid electrolyte layer formed on the ion storage layer is a transparent metal oxide thin film.

The sixth aspect of the invention is the fifth all-solid-state reflective dimming electrochromic element, wherein the transparent metal oxide thin film has a density of 2.8 to 4.3 g/cm$^3$.

The seventh aspect of the invention is the fifth or sixth all-solid-state reflective dimming electrochromic element, wherein the transparent metal oxide thin film comprises tantalum oxide or zirconium oxide.

The eighth aspect of the invention is the first all-solid-state reflective dimming electrochromic element, wherein the buffer layer formed on the solid electrolyte layer is a metal thin film.

The ninth aspect of the invention is the eighth all-solid-state reflective dimming electrochromic element, wherein the metal thin film comprises metallic aluminum, metallic tantalum, or metallic titanium.

The tenth aspect of the invention is the first all-solid-state reflective dimming electrochromic element, wherein the catalyst layer formed on the buffer layer comprises palladium, platinum, silver, or an alloy thereof.

The eleventh aspect of the invention is the first all-solid-state reflective dimming electrochromic element, wherein the reflective dimming layer formed on the catalyst layer is a magnesium alloy thin film of at least a magnesium-nickel, magnesium-titanium, or magnesium-niobium alloy.

The twelfth aspect of the invention is the eleventh all-solid-state reflective dimming electrochromic element, wherein the magnesium alloy thin film comprises at least $MgNi_x$ ($0.1 \leq x \leq 0.5$), $MgTi_x$ ($0.1 \leq x \leq 0.5$), or $MgNb_x$ ($0.3 \leq x \leq 0.6$).

The thirteenth aspect of the invention is the first all-solid-state reflective dimming electrochromic element, wherein the protective layer formed so as to seal the reflective dimming layer surface or the multilayer film comprises an ultraviolet curing resin, an ultraviolet-heat curing resin, a polyvinyl chloride, a polyvinylidene chloride, a fluororesin, tetrafluoroethylene, or a cycloolefin polymer.

The fourteenth aspect of the invention is the first all-solid-state reflective dimming electrochromic element, wherein the protective layer and the multilayer film together cause no chemical reaction, and the protective layer has a cure shrinkage of 10% or less, a water absorption of 3% or less, and a total transmittance of 90% or more and keeps in the transparent state after being cured.

The fifteenth aspect of the invention is the first all-solid-state reflective dimming electrochromic element, wherein the ion storage layer or the reflective dimming layer suffers hydrogenation and/or the solid electrolyte layer contains therein hydrogen.

The sixteenth aspect of the invention is the first all-solid-state reflective dimming electrochromic element, which has a transparent conductive film layer between the reflective dimming layer and the protective layer.

The seventeenth aspect of the invention is the first or sixteenth all-solid-state reflective dimming electrochromic element, wherein the transparent conductive film layer has a surface resistance of smaller than 100 Ω/☐.

The eighteenth aspect of the invention is the first or sixteenth all-solid-state reflective dimming electrochromic element, wherein the transparent conductive film layer comprises at least one member of a metal thin film, an oxide, and an organic compound each having a light transmittance of higher than 70%.

The nineteenth aspect of the invention is a method for producing an all-solid-state reflective dimming electrochromic element having a multilayer film formed on a transparent substrate, wherein the method comprises forming, on a transparent substrate, a transparent conductive film layer, an ion storage layer, a solid electrolyte layer, a buffer layer, and a catalyst layer, and further forming thereon a reflective dimming layer of a magnesium-nickel alloy, magnesium-titanium alloy, or magnesium-niobium alloy thin film and a protective layer.

The twentieth aspect of the invention is a dimming member having incorporated thereinto any one of the first to eighteenth all-solid-state reflective dimming electrochromic elements.

Effect of the Invention

In the above-mentioned first aspect, the reflective dimming element has a multilayer film formed on a transparent substrate, wherein the multilayer film has a multilayer structure comprising at least a transparent conductive film layer, an ion storage layer, a solid electrolyte layer, a buffer layer, a catalyst layer, a reflective dimming layer, and a protective layer formed on the transparent substrate, and therefore an all-solid-state reflective dimming electrochromic element having excellent reflective dimming properties can be provided.

In the above-mentioned second aspect, the transparent substrate in the first all-solid-state reflective dimming electrochromic element is glass or a resin sheet, and thus, by forming an element structure on the resin sheet, a large-size reflective dimming electrochromic element having excellent productivity, ease of use, economical efficiency, and the like and having a large area can be provided.

In the above-mentioned third aspect, the first all-solid-state reflective dimming electrochromic element can exhibit a reflective dimming action by applying a voltage and/or flowing a current between the transparent conductive film layer and the reflective dimming layer, and thus, by electrically and reversibly switching the surface of glass from the mirror state to the transmission state, the transmission of sunlight coming from the window glass can be electrically controlled, making it possible to keep the space of the interior comfortable.

In the above-mentioned fourth to eighteenth aspects, the individual films constituting the multilayer film in the first aspect are selectively specified, making it possible to obtain combined effects including the improvement of the dimming properties and the improvement of the transmittance in the transparent state. Particularly, in the above-mentioned first, thirteenth, and fourteenth aspects, the formation of a protective layer can dramatically improve the element in the durability to environment.

In the above-mentioned nineteenth aspect, a large-size reflective dimming electrochromic element having excellent productivity, ease of use, economical efficiency, and the like and having a large area can be produced in an increased amount by a high-speed process at a low cost.

In the above-mentioned twentieth aspect merely by putting a dimming member having incorporated thereinto the all-solid-state reflective dimming electrochromic element on the existing window glass or the like, an energy saving effect can be achieved, and thus the range of application of the dimming member can be drastically increased.

BRIEF DESCRIPTION OF THE DRAWINGS

FIGS. 1(a) and 1(b) show Diagrammatic views showing an example of the all-solid-state reflective dimming electrochromic element of the invention.

FIG. 2 shows Diagrammatic view showing another example of the all-solid-state reflective dimming electrochromic element of the invention.

FIG. 3 shows Diagrammatic view showing still another example of the all-solid-state reflective dimming electrochromic element of the invention.

FIG. 4 shows Diagrammatic view showing still further another example of the all-solid-state reflective dimming electrochromic element of the invention.

FIG. 5 shows Diagrammatic view of a characteristics evaluation apparatus for the all-solid-state reflective dimming electrochromic element.

FIGS. 6(a) and 6(b) show Graphs showing the switching characteristics (change with time of the optical transmittance and optical reflectance at a wavelength of 670 nm) of the all-solid-state reflective dimming electrochromic element using an ultraviolet-heat curing epoxy resin in the protective layer.

FIGS. 7(a) and (7b) show Graphs showing the transmission spectra and reflection spectra of the all-solid-state reflective dimming electrochromic element using an ultraviolet-heat curing epoxy resin in the protective layer.

FIGS. 9(a)-9(f) show Photographs showing the surface state with respect to the term during which the all-solid-state reflective dimming electrochromic element using an ultraviolet-heat curing epoxy resin in the protective layer is kept in air or in a thermo-hygrostat.

FIGS. 10(a) and 10(b) show Graphs showing the switching characteristics (change with time of the optical transmittance and optical reflectance at a wavelength of 670 nm) of the all-solid-state reflective dimming electrochromic element using a polyvinyl chloride in the protective layer.

FIGS. 11(a) and 11(b) show Graphs showing the transmission spectra and reflection spectra of the all-solid-state reflective dimming electrochromic element using a polyvinyl chloride in the protective layer.

FIGS. 12(a) and 12(b) show Graphs showing the switching characteristics (change with time of the optical transmittance and optical reflectance at a wavelength of 670 nm) of the all-solid-state reflective dimming electrochromic element using a fluororesin in the protective layer.

FIGS. 13(a) and 13(b) show Graphs showing the transmission spectra and reflection spectra of the all-solid-state reflective dimming electrochromic element using a fluororesin in the protective layer.

FIGS. 14(a) and 14(b) show Graphs showing the dimming performance with respect to the term during which the all-solid-state reflective dimming electrochromic element using a fluororesin in the protective layer is kept in a thermo-hygrostat.

FIGS. 15(a)-15(c) show Photographs showing the surface state with respect to the term during which the all-solid-state reflective dimming electrochromic element using a fluororesin in the protective layer is kept in a thermo-hygrostat.

FIGS. 16(a) and 16(b) show Graphs showing the switching characteristics (change with time of the optical transmittance and optical reflectance at a wavelength of 670 nm) of the all-solid-state reflective dimming electrochromic element using a cycloolefin polymer in the protective layer.

FIG. 17 shows Graph showing the dimming performance with respect to the term during which the all-solid-state reflective dimming electrochromic element using a cycloolefin polymer in the protective layer is kept in a thermo-hygrostat.

FIGS. 18(a)-18(c) show Photographs showing the surface state with respect to the term during which the all-solid-state reflective dimming electrochromic element using a cycloolefin polymer in the protective layer is kept in a thermo-hygrostat.

MODE FOR CARRYING OUT THE INVENTION

Figure 8:
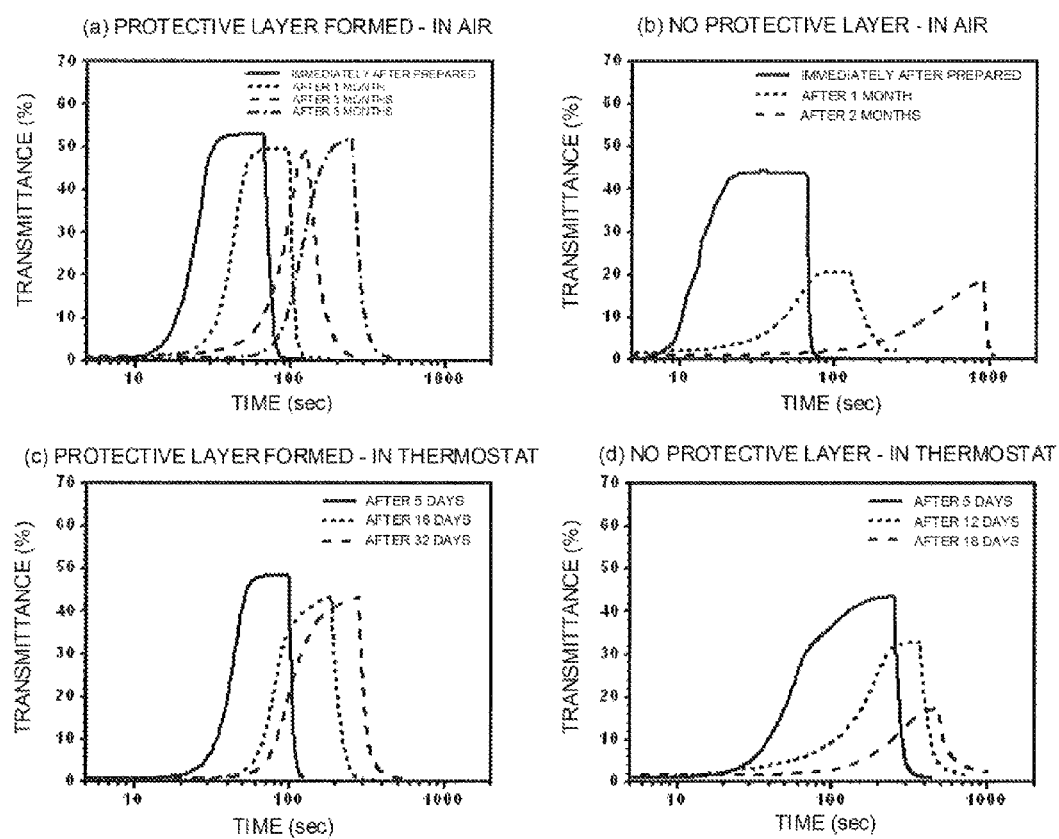
FIGS. 8(a)-8(d) show Graphs showing the dimming performance with respect to the term during which the all-solid-state reflective dimming electrochromic element using an ultraviolet-heat curing epoxy resin in the protective layer is kept in air or in a thermo-hygrostat.

Next, the present invention will be described in more detail.

The all-solid-state reflective dimming electrochromic element of the invention (hereinafter, referred to simply as "electrochromic element") is an electrochromic element all of which is formed from a solid material, and which exhibits a reflective dimming action by applying a voltage to or flowing a current through the element. This electrochromic element has a multilayer structure comprising a transparent conductive film layer, an ion storage layer, a solid electrolyte layer, a buffer layer, a catalyst layer, a reflective dimming layer, and a protective layer formed on a transparent substrate.

Hereinbelow, the layers constituting the electrochromic element of the invention are individually described.

<Transparent Substrate>

With respect to the material for and the form of the transparent substrate used in the electrochromic element of the invention, there is no particular limitation as long as it functions as a transparent substrate for the electrochromic element. It is preferred that the transparent substrate functions not only as a base on which the transparent conductive film layer, ion storage layer, solid electrolyte layer, catalyst layer, reflective dimming layer, and protective layer are formed but also as a barrier for suppressing the penetration of water or oxygen.

As examples of the transparent substrates, there can be mentioned glass and a resin sheet.

With respect to the glass, generally known glass, for example, clear glass, green glass, bronze glass, gray glass, blue glass, UV-cutting thermal-insulating glass, heat ray absorbing glass, or tempered glass can be used. These glasses may be used individually or in combination.

The resin sheet means a transparent substrate made of a synthetic polymer resin, and, from the viewpoint of cost, transparency, heat resistance, and the like, a resin sheet formed from, for example, polyethylene terephthalate (PET), polyethylene naphthalate (PEN), polycarbonate (PC), nylon, or acryl can be preferably used. These resin sheets may be used individually or in combination. With respect to the combination of the resin sheets, there is no particular limitation.

The deposition of the layers is conducted under reduced pressure conditions, and therefore, from the viewpoint of maintaining the reduced pressure, it is preferred that the resin sheet used in the transparent substrate is formed from a material unlikely to cause outgassing. Further, the resin sheet is preferably colorless and transparent, but a colored resin sheet can be used if necessary.

In the transparent substrate, materials, such as the above-mentioned glass and resin sheet, can be used in combination appropriately, and examples of the combinations include a combination of glass and glass, a combination of glass and a resin sheet, and a combination of a resin sheet and a resin sheet.

<Transparent Conductive Film Layer>

The transparent conductive film layer used in the electrochromic element of the invention comprises a conductive material, so that the optical properties of the electrochromic element can be controlled by applying a voltage to and/or flowing a current through the electrochromic element. With respect to the material for the transparent conductive film, there is no particular limitation, and a known material can be used. It is preferred that the transparent conductive film has a surface resistance of 100Ω/□ or less, and it is preferred that the transparent conductive film comprises at least one member of a metal thin film, an oxide, and an organic compound each having a light transmittance of 70% or more. Specifically, tin-doped indium oxide or the like can be preferably used.

<Ion Storage Layer>

The ion storage layer used in the electrochromic element of the invention is a layer having a function to reversibly store and remove hydrogen ions required for switching the mirror state and the transmission state of the reflective dimming layer, and the ion storage layer is not particularly limited as long as the layer has the above-mentioned function.

There can be used a material which is colored if necessary when hydrogen ions are removed from the ion storage layer, but more preferred is a material having properties such that it becomes colorless and transparent when hydrogen ions are removed. With respect to the material constituting the ion storage layer, a transition metal oxide is preferred, and specific examples include tungsten oxide, molybdenum oxide, niobium oxide, and vanadium oxide.

Of these, especially preferred is tungsten oxide having a high stability ($10^6$ cycles or more) as a material constituting the electrochromic element. With respect to the thickness of the ion storage layer, there is no particular limitation, but the thickness of the ion storage layer is preferably in the range of from 250 to 2,000 nm.

<Solid Electrolyte Layer>

The solid electrolyte layer used in the electrochromic element of the invention is formed from a solid material which has properties such that hydrogen ions can easily move through the material by applying a voltage thereto, and which can be stably used for a long term. With respect to the material constituting the solid electrolyte layer, a transparent metal oxide is preferred, and specific examples include tantalum oxide and zirconium oxide. However, the material for the solid electrolyte layer is not limited to these oxides, and any material having an effect similar to that of them can be used. From the viewpoint of the hydrogen ion conductivity of the solid electrolyte layer which determines the switching rate of optical properties, it is preferred that the transparent metal oxide has a density in the range of from 2.8 to 4.3 g/cm$^3$.

In the invention, it is preferred that a transparent metal oxide thin film is formed as the solid electrolyte layer on the ion storage layer. For example, when the solid electrolyte layer is deposited by a magnetron sputtering method, hydrogen ions for driving the electrochromic element of the invention can be introduced to the solid electrolyte layer by allowing the moisture or the like remaining in the sputtering chamber to be contained in the thin film being deposited.

<Buffer Layer>

The buffer layer used in the electrochromic element of the invention uses a material having properties such that hydrogen ions can easily move through the material by applying a voltage thereto, and having a switching function such that the switching rate is improved and uniform in the whole region of the element. With respect to the constituent of the buffer layer, a metal is preferred, and specific examples include metallic aluminum, metallic tantalum, and metallic titanium. However, the material for the buffer layer is not limited to these metals, and any material having an effect similar to that of them can be used. With respect to the thickness of the buffer layer, there is no particular limitation, but the thickness of the buffer layer is preferably in the range of from 1 to 5 nm.

In the invention, it is preferred that a metal thin film is formed as the buffer layer on the solid electrolyte layer.

<Catalyst Layer>

The catalyst layer used in the electrochromic element of the invention has a function of inlet or outlet for supplying hydrogen ions to the reflective dimming layer and discharging hydrogen ions therefrom, and the increase of the rate of supplying or discharging of hydrogen ions by the catalyst layer can improve the properties of switching the mirror state and the transparent state. With respect to the constituent of the catalyst layer, preferred is palladium, platinum, silver, or an alloy thereof, each having excellent ability to transmit hydrogen ions, and, specifically, as a palladium alloy, a palladium-silver alloy, a palladium-platinum alloy, or the like can be preferably used. The palladium alloy containing another component makes it possible to improve the properties. The above-mentioned alloy may contain an impurity, but the amount of the impurity contained in the alloy is preferably reduced.

With respect to the thickness of the catalyst layer, there is no particular limitation, but the thickness of the catalyst layer is preferably in the range of from 0.5 to 10 nm. When the catalyst layer is too small in thickness, there is a possibility that the catalyst layer cannot satisfactorily function as a catalyst. Conversely, when the catalyst layer is too large in thickness, there is a possibility that the light transmittance of the catalyst layer is lowered. Further, when the catalyst layer has a thickness larger than a certain thickness, there is a possibility that even when the thickness of the catalyst layer is increased, the function of the layer as a catalyst is not improved.

<Reflective Dimming Layer>

The reflective dimming layer used in the electrochromic element of the invention is formed from a material having a function to switch the mirror state and the transparent state by having occluded therein hydrogen and hydrogen ions and discharging them. With respect to the constituent of the reflective dimming layer, a magnesium alloy is preferred, and, specifically, a magnesium-nickel alloy (MgNi$_x$ ($0.1 \leq x \leq 0.5$)) in which the ratio of nickel to magnesium (1) is in the range of from 0.1 to 0.5, a magnesium-titanium alloy (MgTi$_x$ ($0.1 \leq x \leq 0.5$)) in which the ratio of titanium to magnesium (1) is in the range of from 0.1 to 0.5, or a magnesium-niobium alloy (MgNb$_x$ ($0.3 \leq x \leq 0.6$)) in which the ratio of niobium to magnesium (1) is in the range of from 0.3 to 0.6 can be used.

Of these, particularly, preferred is a magnesium-nickel alloy because the magnesium-nickel alloy tends to be increased in transmittance when it has hydrogen occluded therein and becomes transparent, and MgNi$_{0.5}$ is especially preferred from the viewpoint of reducing the cost for raw material.

The magnesium alloy containing another component makes it possible to improve the properties. For example, the magnesium-nickel alloy containing a component other than magnesium and nickel can be used as a magnesium-nickel alloy as long as the properties of the magnesium-nickel alloy are maintained. The magnesium-nickel alloy having poor properties can be used as a magnesium-nickel alloy as long as the crystal structure of the magnesium-nickel alloy is partially maintained. The magnesium alloy may contain an impurity, but the amount of the impurity contained in the alloy is preferably reduced.

It is preferred that the reflective dimming layer has a thickness in the range of from 10 to 200 nm. When the reflective dimming layer is too small in thickness, the reflective dimming layer in the mirror state is reduced in light reflectance so that it does not exhibit satisfactory reflection properties. Conversely, when the reflective dimming layer is too large in thickness, the reflective dimming layer in the transparent state is reduced in light transmittance. Different specifications are required according to the application, but can be appropriately adjusted by controlling the thickness of the layer.

<Protective Layer>

The protective layer used in the electrochromic element of the invention can be formed by a magnetron sputtering method which is similar to the method for forming the above-mentioned thin film materials, or a coating method using a solution for facilitating the process. In the formation of the protective layer, it is important that the protective layer being formed and the multilayer film together cause no chemical reaction. When a magnetron sputtering method is used, the protective layer can be formed on the surface of the element by sputtering a tetrafluoroethylene target or a cycloolefin polymer target by a radio frequency magnetron sputtering method.

When a coating method, such as a dip coating method or a spin coating method, is used, a material for forming the protective layer is required to have fluidity, and particularly preferably has a viscosity of 1,000 mPa·s or less. Further, from the viewpoint of the controllability, it is necessary that the applied protective layer completely solidify, and, for example, an ultraviolet curing resin capable of solidifying by irradiation with an ultraviolet (UV) light, a visible light curing resin capable of solidifying by irradiation with a visible light, an electron beam curing resin capable of solidifying by irradiation with an electron beam, a thermosetting resin capable of solidifying by heating, or a resin mixture thereof can be used. Examples of chief materials for the ultraviolet curing resin include oligomers of a di- or triacrylate of polyether, polyester, epoxy, urethane, or spiran, a photopolymerization initiator, a photosensitizer, and analogues thereof. Further examples include an ultraviolet curing acrylic resin, an ultraviolet-heat curing epoxy resin, and a fluororesin solution, but the usable curing resin is not particularly limited as long as the resin satisfies the above-mentioned properties.

Alternatively, the protective layer can be formed by dissolving a polyvinyl chloride (PVC), a polyvinylidene chloride, a cycloolefin polymer, or the like in a solvent and applying the resultant solution.

With respect to the solvent in this case, tetrahydrofuran, benzene, xylene, hexane, cyclohexane, ethanol, acetone, 1-propanol, or the like can be used, and these solvents may be used individually or in combination.

Further, from the viewpoint of the formability, it is preferred that the protective layer does not suffer a marked shrinkage due to the solidification, and the protective layer preferably has a cure shrinkage of 10% or less. When the protective layer having a high cure shrinkage is used, warpage or cracks may be caused in the electrochromic element. Particularly, the important performance of the protective layer used in the invention is to prevent the thin film material from wetting with moisture due to the humidity in air, and therefore it is preferred that the protective layer has a water absorption of lower than 3% and a total transmittance of 90% or more for the optical application and is colorless and transparent after being cured.

Especially when a resin sheet is used as the transparent substrate, a heating process at an excessively high temperature cannot be used, and therefore a material for the protective layer preferably solidifies at a lower temperature. Further, the formation of the protective layer increases the thickness of the multilayer film, and therefore a material for the protective layer more preferably has a function to improve the properties without sacrificing the dimming properties, e.g., without reducing the maximum transmittance.

By sealing the electrochromic element of the invention using the above-mentioned protective layer, the reflective dimming layer can be prevented from suffering deterioration due to the change into an oxide or hydroxide by the humidity in air or the temperature, and further the transparent protective layer sealing the electrochromic element causes interference with the multilayer film, making it possible to improve the transmission performance.

Next, the structure of the electrochromic element of the invention is described in detail with reference to the drawings.

FIGS. 1(a) and 1(b) are diagrammatic cross-sectional views showing an embodiment of the electrochromic element of the invention.

The electrochromic element has a transparent substrate 10 and a multilayer thin film comprising a transparent conductive film layer 20, an ion storage layer 30, a solid electrolyte layer 40, a buffer layer 50, a catalyst layer 60, and a reflective dimming layer 70, and further is sealed with a protective layer 80.

The protective layer can be either formed only on the top of the thin film as shown in FIG. 1(a) or formed to cover and seal the sides of the multilayer film as shown in FIG. 1(b). In the invention, the surface means not only the top of the thin film but also the whole region of surface in contact with air. In this construction, electrodes for switching are connected to the reflective dimming layer 70 and the transparent conductive film 20.

In FIGS. 1(a) and 1(b), the transparent conductive film 20, ion storage layer 30, solid electrolyte layer 40, buffer layer 50, catalyst layer 60, reflective dimming layer 70, and protective layer 80 are stacked on the transparent substrate 10, but another layer can be appropriately stacked between the above layers within the technical range of the invention.

For example, as shown in FIG. 2, a construction of the layers in which a transparent conductive film 90 is formed on the reflective dimming layer 70 can be employed. In this construction, electrodes for switching are connected to the transparent conductive film 90 and the transparent conductive film 20.

In the invention, the "on" used in, for example, the expression reading "on the catalyst layer" has a meaning of the direction of the layer to be stacked and does not always mean that the layer to be stacked is arranged adjacent to a layer. For example, the expression reading "a catalyst layer is formed on the solid electrolyte layer" possibly indicates the case where the solid electrolyte layer and the catalyst layer are arranged adjacent to each other and the case where the solid electrolyte layer and the catalyst layer are arranged so that another layer is disposed between them.

The embodiments of the electrochromic element of the invention are shown in FIGS. 1(a), 1(b) and 2, but the technical range of the invention is not limited to these embodiments. In the invention, as shown in FIG. 3, there can be employed a construction in which the layers of the transparent conductive film layer 20, ion storage layer 30, solid electrolyte layer 40, buffer layer 50, catalyst layer 60, reflective dimming layer 70, transparent conductive film 90, and protective layer 80 together are sandwiched between two transparent substrates.

By virtue of having the construction in which transparent substrates are arranged on the both sides of the layers as mentioned above, the penetration of water or oxygen into the reflective dimming layer can be further suppressed. In the electrochromic element using a resin sheet as the transparent substrate 10, for more effectively preventing the penetration of water or oxygen into the inside of the element, a construction in which the element is further sandwiched between a pair of glasses can be employed.

FIG. 4 shows a diagrammatic cross-sectional view of a reflective dimming plate having a construction in which the electrochromic element is sandwiched between a pair of glasses 110.

As shown in FIG. 4, if necessary, a safety-glass interlayer 100, such as polyvinyl butyral, can be disposed between the glass 110 and the electrochromic element.

Further, when the electrochromic element is sandwiched between the glasses 110, it is preferred that the transparent substrate 10 is a resin sheet. With respect to the transparent conductive film layer 20 on the transparent substrate 10, the use of a transparent substrate having the transparent conductive film layer 20 preliminarily formed thereon can simplify the process for operation.

The electrochromic element having another construction can be obtained by, for example, forming, on a first transparent substrate, a protective layer, a transparent conductive film, a reflective dimming layer, and a catalyst layer, and forming, on a second transparent substrate, a transparent conductive film, an ion storage layer, a solid electrolyte layer, and a buffer layer, and laminating them together.

A method for producing the electrochromic element of the invention is described below.

The thin films constituting the individual layers of the electrochromic element of the invention and the protective layer can be formed using a generally known method and the method is not particularly limited, and examples include methods, such as a magnetron sputtering method, a vacuum vapor deposition method, an electron beam deposition method, a chemical vapor deposition (CVD) method, a plating method, a dip coating method, and a spin coating method.

The electrochromic element of the invention can be produced by successively stacking layers constituting the electrochromic element on a transparent substrate 10 by a method appropriately selected from the above-mentioned deposition methods.

With respect to the size and thickness of each of the layers constituting the electrochromic element, there is no particular limitation, and they can be determined with reference to a known structure, and can be appropriately selected according to the application or desired performance. For example, when the electrochromic element is used in a windshield for automobile, the size of the transparent substrate is determined according to the design of the vehicle. The thickness is determined, taking into consideration the transmittance, strength, and the like of the dimming material.

The dimming operation of the electrochromic element of the invention is described below with reference to FIGS. 1(a) and 1(b).

The dimming of the electrochromic element of the invention is conducted, as shown in FIGS. 1(a) and 1(b), by applying a voltage/current between the transparent conductive film layer 20 and the reflective dimming layer 70. Specifically, when the electrochromic element is in the mirror state, by applying a positive voltage to the transparent conductive film layer 20 and applying a negative voltage to the reflective dimming layer 70, the hydrogen ions stored in the ion storage layer 30 move through the solid electrolyte 40, buffer layer 50, and catalyst layer 60 and are diffused through the reflective dimming layer 70, so that the reflective dimming layer 70 is changed to a hydrogen compound, switching the reflection properties from the mirror state to the transmission state.

In this case, the catalyst layer 60 has a function to promote the giving and receiving of hydrogen ions between the solid electrolyte layer 40 and the reflective dimming layer 70, and the catalyst layer 60 secures a satisfactory switching rate in the reflective dimming layer 70. Conversely, when the electrochromic element is in the transparent state, by applying a negative voltage to the ion storage layer 20 and applying a positive voltage to the reflective dimming layer 70, the hydride in the reflective dimming layer 70 undergoes dehydrogenation, bringing the reflection properties back into the mirror state from the transparent state. The discharged hydrogen moves in the form of hydrogen ions through the catalyst layer 60, buffer layer 50, and solid electrolyte layer 40 and goes back to the ion storage layer 30 where the hydrogen is stored.

A conventional element using a magnesium alloy as a reflective dimming element has a problem in that the element is affected by the environment surrounding it so that the reflective dimming layer is changed into an oxide or hydroxide, causing the dimming properties to deteriorate. In view of the use of the element in the actual environment, e.g., a window material, the prevention of the deterioration of performance is an important task.

By contrast, in the invention, by virtue of having a structure in which the multilayer thin film is sealed with the protective layer, the element is prevented from being in direct contact with air, so that the influence of the oxygen or humidity in air on the element can be moderated, making it possible to provide a reflective dimming electrochromic element having a multilayer film structure which enables long term use, and a dimming member having the element incorporated thereinto. The invention is useful as a practical all-solid-state reflective dimming electrochromic material and a dimming member.

EXAMPLES

Hereinbelow, the present invention will be described in more detail with reference to the following Examples, which should not be construed as limiting the scope of the invention.

Example 1

Example 1 of the invention is described below. In Example 1, an electrochromic element having the construction shown in FIGS. 1(a) and 1(b) was prepared.

[Preparation of an Electrochromic Element]

A transparent substrate of a glass sheet having a thickness of 1.1 mm was coated with a tin-doped indium oxide having a surface resistance of $10\Omega/\square$ as a transparent conductive film layer. The resultant substrate was set in a vacuum apparatus, and the apparatus was evaluated to create a vacuum.

Then, on the transparent conductive film layer, a tungsten oxide thin film was deposited as an ion storage layer by a reactive direct current (DC) magnetron sputtering method using a magnetron sputtering machine. In the deposition of film, sputtering was performed by applying a power of 80 W to a metallic tungsten target in a mixed gas atmosphere having an argon gas to oxygen gas flow rate ratio controlled to 7:1.5 at a pressure of 1.0 Pa in the vacuum chamber. The deposited tungsten oxide thin film had a thickness of about 500 nm.

On the tungsten oxide thin film as an ion storage layer, a tantalum oxide thin film was deposited as a solid electrolyte layer by a reactive DC magnetron sputtering method. In the deposition of film, sputtering was performed by applying a power of 70 W to a metallic tantalum target in a mixed gas atmosphere having an argon gas to oxygen gas flow rate ratio controlled to 7:1 at a pressure of 0.7 Pa in the vacuum chamber. The deposited tantalum oxide thin film had a thickness of about 400 nm and a density of about 3.8 g/cm³.

On the tantalum oxide thin film as a solid electrolyte layer, an aluminum thin film was deposited as a buffer layer by a DC magnetron sputtering method. Sputtering was performed by applying a power of 50 W to a metallic aluminum target using argon gas as an atmosphere gas at a pressure of 0.6 Pa in the vacuum chamber. The deposited aluminum thin film had a thickness of about 2 nm.

On the aluminum thin film as a buffer layer, a palladium thin film as a catalyst layer and a magnesium-nickel alloy thin film as a reflective dimming layer were deposited using a three-gun magnetron sputtering machine. Metallic magnesium, metallic nickel, and metallic palladium as targets were respectively set in the three sputtering guns, and the metallic palladium was first sputtered to deposit a palladium thin film as a catalyst layer so as to have a thickness of about 4 nm.

Sputtering was performed by a DC magnetron sputtering method by applying a power of 14 W to the metallic palladium at an argon gas pressure of 0.8 Pa during the sputtering. Then, a power of 30 W and a power of 16 W were applied to the metallic magnesium and metallic nickel, respectively, to deposit a magnesium-nickel alloy thin film so as to have a thickness of about 40 nm. The composition of magnesium and nickel in the resultant film was substantially $Mg_4Ni$.

An ultraviolet-heat curing epoxy resin (XNR 5541, manufactured by Nagase ChemteX Corporation) was applied as a protective layer so that the resultant protective layer sealed the magnesium-nickel alloy thin film as a reflective dimming layer and other layers in the multilayer film, and further the resultant layer was covered with glass. For curing the ultraviolet-heat curing epoxy resin, using an ultraviolet light curing apparatus, the epoxy resin was irradiated with an ultraviolet light at an ultraviolet intensity of 170 mW/cm² and at a wavelength of 365 nm for 5 minutes. After the irradiation, for stabilizing the resin, the resultant element was kept in a thermostat at 80° C. for 30 minutes, preparing an electrochromic element of a safety glass type.

[Change with Time of the Optical Transmittance and Optical Reflectance]

The obtained electrochromic element was set in the evaluation apparatus shown in FIG. 5, and indium electrodes were connected to the reflective dimming layer of the magnesium-nickel alloy thin film and the transparent conductive film layer of the tin-doped indium oxide, and the optical switching characteristics of the element were evaluated.

The electrochromic element in the initial state was in the mirror state. A voltage of ±5 V was applied between the indium electrodes, and a change of the optical transmittance during the voltage application was measured by means of a measurement system having a combination of a semiconductor laser at a wavelength of 670 nm and a silicon photodiode.

The measured changes with time of the optical transmittance and optical reflectance are shown in FIGS. 6(a) and 6(b), together with the data for comparison of a conventional element having no sealed structure using a protective layer.

With respect to the electrochromic element immediately after being prepared, the magnesium-nickel alloy thin film as a reflective dimming layer has metallic luster, and therefore the electrochromic element reflects a light well (optical reflectance: ~58%), and further the tungsten oxide thin film as an ion storage layer is colored navy blue, and therefore the electrochromic element has an extremely low transmittance (optical transmittance: ~0.2%).

When a voltage of −5 V was applied to the indium electrode side of the multilayer film, the hydrogen ions in the tungsten oxide thin film were diffused through the solid electrolyte and introduced into the magnesium-nickel alloy thin film, so that the tungsten oxide thin film became transparent and the magnesium-nickel alloy thin film also suffered hydrogenation and became transparent (optical reflectance: ~10%; optical transmittance: ~52%). As can be seen from the change with time of the optical transmittance shown in FIG. 6(a), switching was completed in about 25 seconds. Conversely, when a voltage of +5 V was applied to the indium electrode side, the transmittance was reduced in about 10 seconds, bringing the element back into the mirror state.

With respect to the electrochromic element of the invention, the above results have confirmed that the mirror state and the transmission state can be reversibly switched by changing the polarity of the voltage applied to the element. Further, the results have confirmed that by forming a sealed structure using a protective layer, not only is the environmental deterioration suppressed, but also the interference with the multilayer film increases the width of change of the transmittance and reflectance by 20 percent or more and improves the maximum transmittance and maximum reflectance, so that the element exhibits excellent dimming properties.

[Transmission Spectrum and Reflection Spectrum]

The transmission spectra and reflection spectra of the electrochromic element before and after the switching are shown in FIGS. 7(a) and 7(b), together with the data for comparison of a conventional element having no sealed structure using a protective layer. In the transmission spectra and reflection spectra at the measurement wavelengths, as can be seen in FIG. 7(a), the switching causes a marked change.

Thus, the electrochromic element of the invention can be changed by switching in the transmittance and reflectance with respect to lights not only in the visible light region but also in the infrared region, and it has been confirmed that when used as a dimming window material, the electrochromic element can effectively control both the heat of sunlight going into the interior and the heat going out of the interior, and can be applied to various electronic devices and the like utilizing the above-mentioned performance of the element.

[Dimming Performance with Respect to the Term During which the Electrochromic Element is Kept in Air or in a Thermo-Hygrostat]

The relationships between the switching rate of the electrochromic element and the term during which the element is kept in air at room temperature (25° C.) and at a humidity of 50% or kept in a thermo-hygrostat at a temperature of 30° C. and at a humidity of 80% are shown in FIGS. 8(a)-8(d), together with the data for comparison of a conventional element having no sealed structure using a protective layer.

With respect to the electrochromic element having a sealed structure using a protective layer, which is kept in air, as seen in FIG. 8(a), the rate tends to be gradually reduced with the passing of time, but, immediately after the preparation of the element, the rate is 25 seconds, and after a lapse of 8 months, the rate is 2 minutes thus no marked reduction is found in the rate. In contrast, with respect to the conventional element having no sealed structure using a protective layer, as seen in FIG. 8(b), the humidity very likely affects the element, and thus the element slowly lost the ordinary dimming properties, and, after 2 months, the element did not operate and was reduced in the switching rate, and the width of change was narrow.

With respect to the electrochromic element having a sealed structure using a protective layer, which is kept in a thermo-hygrostat as an accelerated test, as seen in FIG. 8(c), the rate tends to be gradually reduced with the passing of time, but, even after a lapse of one month, no marked reduction is found in the rate. In contrast, with respect to the conventional element having no sealed structure using a protective layer, as seen in FIG. 8(d), the humidity very likely affects the element, and the element considerably deteriorated after about 3 weeks.

Further, the surface state of the electrochromic element kept in a thermo-hygrostat at a temperature of 40° C. and at a humidity of 80% is shown in FIGS. 9(a)-9(f). In the electrochromic element having a sealed structure using a protective layer, as seen in FIGS. 9(a) to 9(c), no change was observed in the surface state regardless of the passage of time, but, in the conventional element having no sealed structure using a protective layer, as seen in FIGS. 9(d) to 9(f), the temperature and humidity affected the element to cause a markedly uneven surface in a short term. These results have confirmed that by forming a sealed structure using a protective layer, the environmental deterioration is suppressed.

Example 2

Preparation of an Electrochromic Element

Tungsten oxide, tantalum oxide, aluminum, palladium, and magnesium-nickel alloy thin films were deposited on a glass substrate having a transparent conductive film using a magnetron sputtering method in accordance with the same procedure as in Example 1. The conditions for the depositions of respective films are the same as those in Example 1.

A solution of a mixture of a polyvinyl chloride and tetrahydrofuran was applied as a protective layer by a spin coating method so that the resultant protective layer sealed the multilayer film including the magnesium-nickel alloy thin film as a reflective dimming layer. As the coating solution, a solution obtained by dissolving 1 g of a polyvinyl chloride in 50 ml of tetrahydrofuran was used. After the application, the resultant element was kept in a thermostat at 50° C. so that the solvent was allowed to volatilize to form a protective layer of the polyvinyl chloride, preparing an electrochromic element.
[Change with Time of the Optical Transmittance and Optical Reflectance]

The obtained electrochromic element was set in the evaluation apparatus shown in FIG. 5 in the same manner as in Example 1, and indium electrodes were connected to the reflective dimming layer of the magnesium-nickel alloy thin film and the transparent conductive film layer of the tin-doped indium oxide, and the optical switching characteristics of the element were evaluated.

The electrochromic element in the initial state was in the mirror state. A voltage of ±5 V was applied between the indium electrodes, and a change of the optical transmittance during the voltage application was measured by means of a measurement system having a combination of a semiconductor laser at a wavelength of 670 nm and a silicon photodiode.

The measured changes with time of the optical transmittance and optical reflectance are shown in FIGS. 10(a) and 10(b), together with the data for comparison of a conventional element having no sealed structure using a protective layer.

With respect to the electrochromic element immediately after being prepared, the magnesium-nickel alloy thin film as a reflective dimming layer has metallic luster, and therefore the electrochromic element reflects a light well (optical reflectance: ~58%), and the tungsten oxide thin film as an ion storage layer is colored navy blue, and therefore the electrochromic element has an extremely low transmittance (optical transmittance: ~0.1%).

When a voltage of −5 V was applied to the indium electrode side of the multilayer film, the hydrogen ions in the tungsten oxide thin film were diffused through the solid electrolyte and introduced into the magnesium-nickel alloy thin film. As a result, the tungsten oxide thin film became transparent, and the magnesium-nickel alloy thin film also suffered hydrogenation and became transparent (optical reflectance: ~10%; optical transmittance: ~56%). After about 30 seconds from the start of application of the voltage, the transmittance reached 90% of the maximum transmittance. Conversely, when a voltage of +5 V was applied to the indium electrode side, the transmittance was reduced in about 15 seconds, bringing the element back into the mirror state.

With respect to the electrochromic element of the invention, the above results have confirmed that the mirror state and the transmission state can be reversibly switched by changing the polarity of the voltage applied to the element. Further, a comparison of the results of the element of the invention with the data of the conventional element having no sealed structure using a protective layer has confirmed that, by forming a protective layer from a polyvinyl chloride, the interference with the multilayer film improves the width of change of the transmittance and reflectance, the maximum transmittance, and the maximum reflectance, so that the element exhibits excellent dimming properties.
[Transmission Spectrum and Reflection Spectrum]

The transmission spectra and reflection spectra of the electrochromic element before and after the switching are shown in FIGS. 11(a) and 11(b), together with the data for comparison of a conventional element having no sealed structure using a protective layer. In the transmission spectra and reflection spectra at the measurement wavelengths, it is found that the switching causes a marked change.

Thus, the electrochromic element of the invention can be changed by switching in the transmittance and reflectance with respect to lights not only in the visible light region but also in the infrared region, and it has been confirmed that when used as a dimming window material, the electrochromic element can effectively control both the heat of sunlight going into the interior and the heat going out of the interior, and can be applied to various electronic devices and the like utilizing the above-mentioned performance of the element.

Example 3

Preparation of an Electrochromic Element

Tungsten oxide, tantalum oxide, aluminum, palladium, and magnesium-nickel alloy thin films were deposited on a glass substrate having a transparent conductive film using a magnetron sputtering method in accordance with the same procedure as in Example 1. The conditions for the depositions of respective films are the same as those in Example 1.

A fluororesin (DURASURF DS-5400, manufactured by Harves Co., Ltd.) was applied as a protective layer by a spin coating method so that the resultant protective layer sealed the multilayer film including the magnesium-nickel alloy thin film as a reflective dimming layer. After the application, the solvent component was allowed to spontaneously volatilize to form a protective layer of the fluororesin on the surface of element, preparing an electrochromic element.
[Change with Time of the Optical Transmittance and Optical Reflectance]

The obtained element was set in the evaluation apparatus shown in FIG. 5 in the same manner as in Example 1, and indium electrodes were connected to the reflective dimming layer of the magnesium-nickel alloy thin film and the transparent conductive film layer of the tin-doped indium oxide, and the optical switching characteristics of the element were evaluated. The electrochromic element in the initial state was in the mirror state. A voltage of ±5 V was applied between the indium electrodes, and a change of the optical transmittance during the voltage application was measured by means of a measurement system having a combination of a semiconductor laser at a wavelength of 670 nm and a silicon photodiode.

The measured changes with time of the optical transmittance and optical reflectance are shown in FIGS. 12(a) and 12(b), together with the data for comparison of a conventional element having no sealed structure using a protective layer.

With respect to the electrochromic element immediately after being prepared, the magnesium-nickel alloy thin film as a reflective dimming layer has metallic luster, and therefore the electrochromic element reflects a light well (optical reflectance: ~61%), and the tungsten oxide thin film as an ion storage layer is colored navy blue, and therefore the electrochromic element has an extremely low transmittance (optical transmittance: ~0.2%). When a voltage of −5 V was applied to the indium electrode side of the multilayer film, the hydrogen ions in the tungsten oxide thin film were diffused through the solid electrolyte and introduced into the magnesium-nickel alloy thin film.

As a result, the tungsten oxide thin film became transparent, and the magnesium-nickel alloy thin film also suffered hydrogenation and became transparent (optical reflectance: ~12%; optical transmittance: ~52%). After about 20 seconds from the start of application of the voltage, 52% of the maximum transmittance was exhibited. Conversely, a voltage of +5 V was applied to the indium electrode side, the transmittance was reduced in about 15 seconds, bringing the element back into the mirror state.

With respect to the electrochromic element of the invention, the above results have confirmed that the mirror state and the transmission state can be reversibly switched by changing the polarity of the voltage applied to the element. Further, a comparison of the results of the element of the invention with the data of the conventional element having no sealed structure using a protective layer has confirmed that, by forming a sealed structure using a fluororesin, the interference with the multilayer film improves the width of change of the transmittance and reflectance, the maximum transmittance, and the maximum reflectance, so that the element exhibits excellent dimming properties.

[Transmission Spectrum and Reflection Spectrum]

The transmission spectra and reflection spectra of the electrochromic element before and after the switching are shown in FIGS. 13(a) and 13(b). In the transmission spectra and reflection spectra at the measurement wavelengths, as can be seen in FIG. 13(a), the switching causes a marked change.

Thus, the electrochromic element of the invention can be changed by switching in the transmittance and reflectance with respect to lights not only in the visible light region but also in the infrared region, and it has been confirmed that when used as a dimming window material, the electrochromic element can effectively control both the heat of sunlight going into the interior and the heat going out of the interior, and can be applied to various electronic devices and the like utilizing the above-mentioned performance of the element.

[Dimming Performance with Respect to the Term During which the Electrochromic Element is Kept in a Thermo-Hygrostat]

The relationship between the switching rate of the electrochromic element and the term during which the element is kept in a thermo-hygrostat at a temperature of 30° C. and at a humidity of 80% is shown in FIGS. 14(a) and 14(b). With respect to the electrochromic element having a sealed structure using a protective layer, as seen in FIG. 14(a), the rate tends to be gradually reduced with the passing of time, but, even after a lapse of one week, no marked reduction is found in the rate.

In contrast, with respect to the conventional element having no sealed structure using a protective layer, as seen in FIG. 14(b), the humidity very likely affects the element and thus, after a lapse of one week, the element exhibited a switching rate of about 15 minutes, and, after 7 days, the element did not operate.

Further, the surface state of the electrochromic element kept in a thermo-hygrostat at a temperature of 40° C. and at a humidity of 80% is shown in FIGS. 15(a)-15(c). In the electrochromic element having a sealed structure using a protective layer, no change was observed in the surface state regardless of the passage of time. These results have confirmed that by forming a sealed structure using a protective layer, the environmental deterioration can be suppressed.

Example 4

Preparation of an Electrochromic Element

Tungsten oxide, tantalum oxide, aluminum, palladium, and magnesium-nickel alloy thin films were deposited on a glass substrate having a transparent conductive film using a magnetron sputtering method in accordance with the same procedure as in Example 1. The conditions for the depositions of respective films are the same as those in Example 1.

A solution of a mixture of a cycloolefin polymer (APL 5014DP, manufactured by Mitsui Chemicals, Inc.) and cyclohexane was applied as a protective layer to the surface of element by a coating method so that the resultant protective layer sealed the multilayer film including the magnesium-nickel alloy thin film as a reflective dimming layer. As the coating solution, a solution obtained by dissolving 2.5 g of a cycloolefin polymer in 50 ml of cyclohexane was used, and the resultant layer was covered with glass. After the application, the resultant element was kept in a thermostat at 50° C. so that the solvent was allowed to volatilize to form a protective layer of the cycloolefin polymer, preparing an electrochromic element of a safety glass type.

[Change with Time of the Optical Transmittance and Optical Reflectance]

The obtained electrochromic element was set in the evaluation apparatus shown in FIG. 5 in the same manner as in Example 1, and indium electrodes were connected to the reflective dimming layer of the magnesium-nickel alloy thin film and the transparent conductive film layer of the tin-doped indium oxide, and the optical switching characteristics of the element were evaluated.

The electrochromic element in the initial state was in the mirror state. A voltage of ±5 V was applied between the indium electrodes, and a change of the optical transmittance during the voltage application was measured by means of a measurement system having a combination of a semiconductor laser at a wavelength of 670 nm and a silicon photodiode.

The measured changes with time of the optical transmittance and optical reflectance are shown in FIGS. 16(a) and 16(b), together with the data for comparison of a conventional element having no sealed structure using a protective layer.

With respect to the electrochromic element immediately after being prepared, the magnesium-nickel alloy thin film as a reflective dimming layer has metallic luster, and therefore the electrochromic element reflects a light well (optical reflectance: ~57%), and the tungsten oxide thin film as an ion storage layer is colored navy blue, and therefore the electrochromic element has an extremely low transmittance (optical transmittance: ~0.3%). When a voltage of −5 V was applied to the indium electrode side of the multilayer film, the hydrogen ions in the tungsten oxide thin film were diffused through the solid electrolyte and introduced into the magnesium-nickel alloy thin film.

As a result, the tungsten oxide thin film became transparent, and the magnesium-nickel alloy thin film also suffered hydrogenation and became transparent (optical reflectance: ~15%; optical transmittance: ~52%). After about 30 seconds from the start of application of the voltage, the transmittance reached 90% of the maximum transmittance. Conversely, when a voltage of +5 V was applied to the indium electrode side, the transmittance was reduced, bringing the element back into the mirror state.

With respect to the electrochromic element of the invention, the above results have confirmed that the mirror state and the transmission state can be reversibly switched by changing the polarity of the voltage applied to the element. Further, a comparison of the results of the element of the invention with the data of the conventional element having no sealed structure using a protective layer has confirmed that, by forming a sealed structure using a fluororesin, the interference with the multilayer film improves the width of change of the transmittance and reflectance, the maximum transmittance, and the maximum reflectance, so that the element exhibits excellent dimming properties.

[Dimming Performance with Respect to the Term During which the Electrochromic Element is Kept in Air]

The relationship between the switching rate of the electrochromic element and the term during which the element is kept in air at room temperature (40° C.) and at a humidity of 80% is shown in FIG. 17. With respect to the electrochromic element having a sealed structure using a protective layer, as seen in FIG. 17, after kept in air for one week, almost no change is found in the switching rate.

Further, the surface state of the electrochromic element kept in a thermo-hygrostat at a temperature of 40° C. and at a humidity of 80% is shown in FIGS. 18(*a*)-18(*c*), but, in the electrochromic element having a sealed structure using a protective layer, no change is observed in the surface state regardless of the passage of time. These results have confirmed that by forming a sealed structure using a protective layer, the environmental deterioration can be suppressed.

[Transmission Spectrum]

Figure 19:
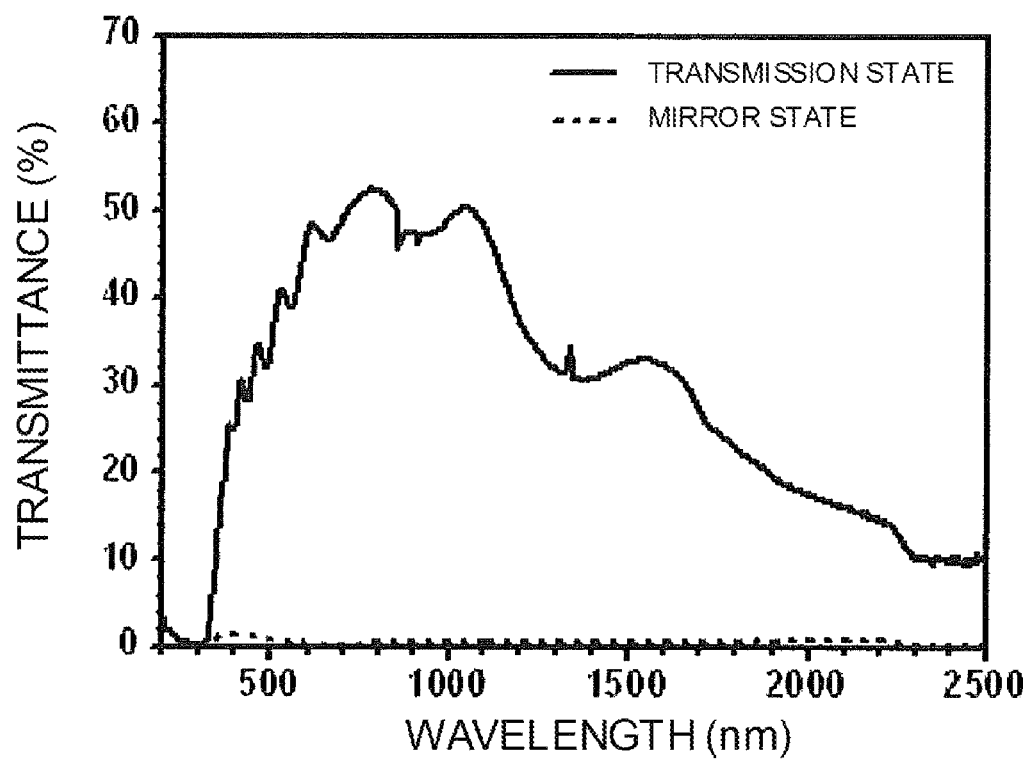
FIG. 19 shows Graph showing the transmission spectra of the all-solid-state reflective dimming electrochromic element using a cycloolefin polymer in the protective layer.

The transmission spectra of the electrochromic element before and after the switching are shown in FIG. 19. In the transmission spectra at the measurement wavelengths, as can be seen in FIG. 19, the switching causes a marked change.

Thus, the electrochromic element of the invention can be changed by switching in the optical properties with respect to lights not only in the visible light region but also in the infrared region, and it has been confirmed that when used as a dimming window material, the electrochromic element can effectively control both the heat of sunlight going into the interior and the heat going out of the interior by switching, and can be applied to various electronic devices and the like utilizing the above-mentioned performance of the element.

DESCRIPTION OF REFERENCE NUMERALS AND SIGNS

10: Transparent substrate
20: Transparent conductive film layer
30: Ion storage layer
40: Solid electrolyte layer
50: Buffer layer
60: Catalyst layer
70: Reflective dimming layer
80: Protective layer
90: Transparent conductive film
100: Interlayer for glass
110: Glass
501: All-solid-state reflective dimming electrochromic element
502: Semiconductor laser (λ=670 nm)
503: Si Photodiode
504: Digital multi-meter
505: Digital multi-meter
506: Source meter
507: Computer

The invention claimed is:

1. An all-solid-state reflective dimming electrochromic element having a multilayer film formed on a transparent substrate, wherein:
   the multilayer film has a multilayer structure comprising at least a transparent conductive film layer, an ion storage layer, a solid electrolyte layer, a buffer layer, a catalyst layer, a reflective dimming layer comprising a magnesium alloy thin film, and a protective layer formed successively on the transparent substrate;
   the protective layer comprises an ultraviolet curing resin, an ultraviolet-heat curing resin, a polyvinyl chloride, a polyvinylidene chloride, a fluororesin, tetrafluoroethylene, or a cycloolefin polymer;
   the protective layer seals the reflective dimming layer surface or the multilayer film;
   the protective layer does not chemically react with the other layers of the multilayer film; and
   the protective layer has a cure shrinkage of 10% or less, a water absorption of 3% or less, and a total transmittance of 90% or more and is transparent if cured.

2. The all-solid-state reflective dimming electrochromic element according to claim 1, wherein the transparent substrate is glass or a resin sheet.

3. The all-solid-state reflective dimming electrochromic element according to claim 1, wherein said element is capable of exhibiting a reflective dimming action by application of a voltage and/or flowing a current between the transparent conductive film layer and the reflective dimming layer.

4. The all-solid-state reflective dimming electrochromic element according to claim 1, wherein the ion storage layer formed on the transparent conductive film layer is a transition metal oxide thin film.

5. The all-solid-state reflective dimming electrochromic element according to claim 1, wherein the solid electrolyte layer formed on the ion storage layer is a transparent metal oxide thin film.

6. The all-solid-state reflective dimming electrochromic element according to claim 5, wherein the transparent metal oxide thin film has a density of 2.8 to 4.3 g/cm$^3$.

7. The all-solid-state reflective dimming electrochromic element according to claim 5, wherein the transparent metal oxide thin film comprises tantalum oxide or zirconium oxide.

8. The all-solid-state reflective dimming electrochromic element according to claim 1, wherein the buffer layer formed on the solid electrolyte layer is a metal thin film.

9. The all-solid-state reflective dimming electrochromic element according to claim 8, wherein the metal thin film comprises metallic aluminum, metallic tantalum, or metallic titanium.

10. The all-solid-state reflective dimming electrochromic element according to claim 1, wherein the catalyst layer formed on the buffer layer comprises palladium, platinum, silver, or an alloy thereof.

11. The all-solid-state reflective dimming electrochromic element according to claim 1, wherein the magnesium alloy thin film comprises magnesium-nickel, magnesium-titanium, or magnesium-niobium alloy.

12. The all-solid-state reflective dimming electrochromic element according to claim 11, wherein the magnesium alloy thin film comprises at least $MgNi_x$ ($0.1 \leq x \leq 0.5$), $MgTi_x$ ($0.1 \leq x \leq 0.5$), or $MgNb_x$ ($0.3 \leq x \leq 0.6$).

13. The all-solid-state reflective dimming electrochromic element according to claim 1, wherein the ion storage layer or the reflective dimming layer is hydrogenated and/or the solid electrolyte layer contains hydrogen.

14. The all-solid-state reflective dimming electrochromic element according to claim 1, further comprising a transparent conductive film layer between the reflective dimming layer and the protective layer.

15. The all-solid-state reflective dimming electrochromic element according to claim 1, wherein the transparent conductive film layer has a surface resistance of smaller than 100 $\Omega/\square$.

16. The all-solid-state reflective dimming electrochromic element according to claim 1, wherein the transparent conductive film layer comprises at least a metal thin film, an oxide, or an organic compound, each having a light transmittance of higher than 70%.

17. A dimming member comprising the all-solid-state reflective dimming electrochromic element according to claim 1.

* * * * *